United States Patent
Zeng et al.

(10) Patent No.: US 12,468,029 B2
(45) Date of Patent: Nov. 11, 2025

(54) ELECTROMAGNETIC WAVE IMAGING METHOD, APPARATUS, AND SYSTEM

(71) Applicant: Huawei Technologies Co., Ltd., Shenzhen (CN)

(72) Inventors: Kun Zeng, Chengdu (CN); Guangjian Wang, Chengdu (CN); Dongyu Geng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 221 days.

(21) Appl. No.: 18/170,451

(22) Filed: Feb. 16, 2023

(65) Prior Publication Data
US 2023/0194701 A1 Jun. 22, 2023

Related U.S. Application Data

(63) Continuation of application No. PCT/CN2021/110883, filed on Aug. 5, 2021.

(30) Foreign Application Priority Data

Aug. 17, 2020 (CN) .......................... 202010826573.5

(51) Int. Cl.
*G01S 13/90* (2006.01)
*G01S 7/41* (2006.01)
*G01S 13/88* (2006.01)

(52) U.S. Cl.
CPC ........... *G01S 13/9027* (2019.05); *G01S 7/411* (2013.01); *G01S 13/887* (2013.01); *G01S 13/9004* (2019.05); *G01S 13/9058* (2019.05)

(58) Field of Classification Search
CPC ............. G01S 13/9027; G01S 13/9004; G01S 13/9058; G01S 7/411; G01S 13/887
See application file for complete search history.

(56) References Cited

U.S. PATENT DOCUMENTS 10,823,841 B1 * 11/2020 Lien .................. G01S 13/88
11,715,228 B2 * 8/2023 Sheen ................ G01S 7/2955
342/25 A (Continued)

FOREIGN PATENT DOCUMENTS

CN 101234022 A 8/2008
CN 106338732 A 1/2017

(Continued)

OTHER PUBLICATIONS

Antenna array, https://baike.baidu.com/item/%E9%98%B5%E5%88%97%E5%A4%A9%E7%BA%BF, Mar. 27, 2024, total 5 pages.

(Continued)

*Primary Examiner* — Vladimir Magloire
*Assistant Examiner* — Nazra Nur Waheed
(74) *Attorney, Agent, or Firm* — Slater Matsil, LLP

(57) ABSTRACT

An electromagnetic wave imaging method, system, and apparatus are provided. The method includes collecting an electromagnetic echo signal, where the electromagnetic echo signal is used to indicate electromagnetic wave scattering feature information of a target object, obtaining location information of a reception point of the electromagnetic echo signal, where the location information indicates relative location information between the reception point and a positioning label, and performing electromagnetic wave imaging on the target object based on the electromagnetic wave scattering feature information and the location information.

20 Claims, 14 Drawing Sheets

(56) References Cited

U.S. PATENT DOCUMENTS

| | | | | |
|---|---|---|---|---|
| 2008/0117094 | A1* | 5/2008 | Lindoff | G01S 13/522 |
| | | | | 342/134 |
| 2009/0014520 | A1* | 1/2009 | Kofman | G06K 19/06037 |
| | | | | 235/492 |
| 2021/0223386 | A1* | 7/2021 | Gao | G01S 13/867 |
| 2021/0405182 | A1* | 12/2021 | Reynolds | G01S 13/887 |

FOREIGN PATENT DOCUMENTS

| | | |
|---|---|---|
| CN | 110680319 A | 1/2020 |
| CN | 110967692 A | 4/2020 |

OTHER PUBLICATIONS

Jaime Laviada et al., Multiview three-dimensional reconstruction by millimeter-wave portable camera, Jul. 25, 2017, total 11 pages.
Guillermo Ivarez-Narciandi et al, Freehand, Agile, and High-Resolution Imaging With Compact mm-Wave Radar, Jul. 17, 2019, total 11 pages.
Optitrack, https://www.optitrack.com/, 2024, total 5 pages.
Ligang Wang et al., Hardware design of landmark positioning system based on binocular vision, optical instrument, vol. 37, No. 2, Apr. 2015, total 5 pages.
LongTooth-Robin, Fully understand the positioning methods in base station positioning: TOA/TDOA/RSS/AOA/COO?, https://www.zhihu.com/question/273986591, Apr. 21, 2018, total 9 pages.
Time-of-flight camera, https://en.wikipedia.org/wiki/Time-of-flight_camera, Aug. 10, 2024, total 12 pages.
Synthetic-aperture radar, https://en.wikipedia.org/wiki/Synthetic-aperture_radar, Mar. 12, 2024, total 20 pages.

* cited by examiner

ELECTROMAGNETIC WAVE IMAGING METHOD, APPARATUS, AND SYSTEM

CROSS-REFERENCE TO RELATED APPLICATIONS

This application is a continuation of International Application No. PCT/CN2021/110883, filed on Aug. 5, 2021, which claims priority to Chinese Patent Application No. 202010826573.5, filed on Aug. 17, 2020. The disclosures of the aforementioned applications are hereby incorporated by reference in their entireties.

TECHNICAL FIELD

Embodiments of this application relate to the electromagnetic wave imaging field, and in particular, to an electromagnetic wave imaging method, apparatus, and system.

BACKGROUND

Electromagnetic wave imaging is an imaging means in which an electromagnetic wave is used as an information carrier. A principle of electromagnetic wave imaging is to reconstruct a shape, a characteristic, or dielectric constant distribution of an object by actively or passively detecting a to-be-imaged target and a signal of a surrounding scattering field, to form an image. Because an electromagnetic wave band is less than an optical band, many objects that cannot be penetrated by the optical band become transparent to the electromagnetic wave band, so that a perspective capability of the inside of the object is achieved. Therefore, electromagnetic wave imaging has extremely high application value in commercial and scientific fields such as lossless detection, security detection, and medical detection.

Currently, there are usually two electromagnetic wave imaging manners. In one manner, electromagnetic wave imaging is performed by using a real array technology. However, to implement relatively high imaging performance, a relatively large array aperture usually needs to be disposed, causing a relatively large volume of a real array apparatus. In the other manner, an apparatus that has a relatively small volume and that performs electromagnetic wave imaging based on a synthetic aperture technology is used. In this manner, relatively high track positioning precision is required. To achieve relatively high track positioning precision, in the conventional technology, a manner of mechanically performing precise control, for example, by using a mechanical arm or performing optical tracking, is usually used to control a moving track of the apparatus. However, in this manner, the apparatus still has a relatively large volume and is not portable.

SUMMARY

This application provides an electromagnetic wave imaging method, apparatus, and system, to meet a requirement for a portable and miniaturized electronic device.

To achieve the foregoing objective, the following technical solutions are used in this application.

According to a first aspect, an embodiment of this application provides an electromagnetic wave imaging system. The electromagnetic wave imaging system includes an electromagnetic echo signal collection module, a self-positioning module, and an imaging module. Specifically, the electromagnetic echo signal collection module is configured to: collect an electromagnetic echo signal, and output first information to the imaging module. The first information includes electromagnetic wave scattering feature information of a target object. The self-positioning module is configured to: obtain location information of a reception point of the electromagnetic echo signal, and output the location information to the imaging module. The location information is used to indicate relative location information between the reception point and a positioning label. The imaging module is configured to perform electromagnetic wave imaging on the target object based on the electromagnetic wave scattering feature information and the location information. In this way, in this application, a requirement for a portable and miniaturized electronic device can be met while self-positioning precision of the electronic device is ensured.

With reference to the first aspect, the electromagnetic echo signal collection module is configured to: collect electromagnetic echo signals at a plurality of moments, and output first information corresponding to each of the plurality of moments to the imaging module. The self-positioning module is configured to: obtain location information of reception points of electromagnetic echo signals at a plurality of moments, and output location information corresponding to each of the plurality of moments to the imaging module. The imaging module is configured to perform electromagnetic wave imaging on the target object based on a plurality of pieces of electromagnetic wave scattering feature information and a correspondence between all of a plurality of pieces of location information and the plurality of pieces of electromagnetic wave scattering feature information. In this way, the imaging module can perform electromagnetic wave imaging on the target object based on the plurality of pieces of obtained electromagnetic wave scattering feature information, the plurality of pieces of obtained location information, and a correspondence between the plurality of pieces of obtained electromagnetic wave scattering feature information and the plurality of pieces of obtained location information, so that self-positioning precision of the electronic device is ensured.

With reference to any one of the first aspect and the foregoing implementations of the first aspect, the plurality of moments at which the electromagnetic echo signal collection module collects the electromagnetic echo signal meet a first period, and the plurality of moments at which the self-positioning module obtains the location information meet a second period. The first period is the same as the second period; or there is a multiple relationship between the first period and the second period. In this way, the electromagnetic echo signal collection module and the self-positioning module may perform corresponding operations based on the respective periods, to implement synchronization between collection of the electromagnetic echo signal and obtaining of the location information, so that the imaging module can obtain the correspondence between the plurality of pieces of electromagnetic wave scattering feature information and the plurality of pieces of location information.

With reference to any one of the first aspect and the foregoing implementations of the first aspect, the electromagnetic wave imaging system further includes at least three sensors, and the self-positioning module is configured to: obtain relative location information between each of the at least three sensors and the positioning label, and obtain relative location information between the reception point and the positioning label based on relative location information between the at least three sensors and the positioning label and relative location information between the at least three sensors and the reception point. In this way, in this application, the reception point can be precisely positioned by using information or parameters collected by the at least three sensors. For example, a larger quantity of sensors indicates more precise positioning.

With reference to any one of the first aspect and the foregoing implementations of the first aspect, the relative location information between the sensor and the positioning label is obtained based on distance information between the sensor and the positioning label. In this way, in this application, the reception point can be precisely positioned based on distance information that is between a plurality of ranging sensors and the positioning label and that is obtained by the plurality of ranging sensors.

With reference to any one of the first aspect and the foregoing implementations of the first aspect, the relative location information between the sensor and the positioning label is obtained based on angle information between the sensor and the positioning label. In this way, in this application, the reception point can be precisely positioned based on angle information that is between a plurality of goniometric sensors and the positioning label and that is obtained by the plurality of goniometric sensors.

With reference to any one of the first aspect and the foregoing implementations of the first aspect, the positioning label is at least one of the following: an identification point disposed on the target object, an identification point disposed in a specified range of the target object, and any feature point on the target object. Therefore, the positioning label in this application may be virtual or physical, so that flexibility of the positioning label is improved.

With reference to any one of the first aspect and the foregoing implementations of the first aspect, the system further includes a synchronization module, configured to send control signals to the electromagnetic echo signal collection module and the self-positioning module. The control signals are used to synchronize collection of the electromagnetic echo signal performed by the electromagnetic echo signal collection module with obtaining of the location information performed by the self-positioning module. In this way, the synchronization module delivers the control signals, so that the action of collecting the electromagnetic echo signal by the electromagnetic echo signal collection module is synchronized with the action of obtaining the location information by the self-positioning module, so that the imaging module obtains electromagnetic wave scattering feature information and location information that are in a one-to-one correspondence.

With reference to any one of the first aspect and the foregoing implementations of the first aspect, the electromagnetic echo signal collection module is specifically configured to: transmit an electromagnetic wave, and receive an electromagnetic echo signal scattered by the target object. In this way, the electromagnetic echo signal collection module can obtain the electromagnetic echo signal through active collection.

With reference to any one of the first aspect and the foregoing implementations of the first aspect, the electromagnetic echo signal collection module is specifically configured to receive an electromagnetic echo signal released by the target object. In this way, the electromagnetic echo signal collection module can obtain the electromagnetic echo signal through passive collection.

According to a second aspect, an embodiment of this application provides an electromagnetic wave imaging method. The method is applied to an electromagnetic wave imaging apparatus. The method includes: collecting an electromagnetic echo signal, where the electromagnetic echo signal is used to indicate electromagnetic wave scattering feature information of a target object; obtaining location information of a reception point of the electromagnetic echo signal, where the location information is used to indicate relative location information between the reception point and a positioning label; and performing electromagnetic wave imaging on the target object based on the electromagnetic wave scattering feature information and the location information.

With reference to the second aspect, the collecting an electromagnetic echo signal includes: collecting electromagnetic echo signals at a plurality of moments; the obtaining location information of a reception point of the electromagnetic echo signal includes: obtaining location information of reception points of electromagnetic echo signals at a plurality of moments; and the performing electromagnetic wave imaging on the target object based on the electromagnetic wave scattering feature information and the location information includes: performing electromagnetic wave imaging on the target object based on a plurality of pieces of electromagnetic wave scattering feature information and a correspondence between all of a plurality of pieces of location information and the plurality of pieces of electromagnetic wave scattering feature information.

With reference to any one of the second aspect and the foregoing implementations of the second aspect, the plurality of moments at which the electromagnetic echo signal is collected meet a first period, and the plurality of moments at which the location information is obtained meet a second period. The first period is the same as the second period; or there is a multiple relationship between the first period and the second period.

With reference to any one of the second aspect and the foregoing implementations of the second aspect, the electromagnetic wave imaging apparatus includes at least three sensors, and the obtaining location information of a reception point of the electromagnetic echo signal includes: obtaining relative location information between each of the at least three sensors and the positioning label, and obtaining relative location information between the reception point and the positioning label based on relative location information between the at least three sensors and the positioning label and relative location information between the at least three sensors and the reception point.

With reference to any one of the second aspect and the foregoing implementations of the second aspect, the relative location information between the sensor and the positioning label is obtained based on distance information between the sensor and the positioning label.

With reference to any one of the second aspect and the foregoing implementations of the second aspect, the relative location information between the sensor and the positioning label is obtained based on angle information between the sensor and the positioning label.

With reference to any one of the second aspect and the foregoing implementations of the second aspect, the positioning label is at least one of the following: an identification point disposed on the target object, an identification point disposed in a specified range of the target object, and any feature point on the target object.

With reference to any one of the second aspect and the foregoing implementations of the second aspect, collection of the electromagnetic echo signal is synchronized with obtaining of the location information.

With reference to any one of the second aspect and the foregoing implementations of the second aspect, the collecting an electromagnetic echo signal includes: transmitting an electromagnetic wave, and receiving an electromagnetic echo signal scattered by the target object.

With reference to any one of the second aspect and the foregoing implementations of the second aspect, the collecting an electromagnetic echo signal includes: receiving an electromagnetic echo signal released by the target object.

According to a third aspect, an embodiment of this application provides an electromagnetic wave imaging apparatus. The apparatus includes a processor, a transceiver, and at least three sensors. The processor is coupled to the transceiver and the at least three sensors. The transceiver is configured to: receive and collect an electromagnetic echo signal, and output the electromagnetic echo signal to the processor. The electromagnetic echo signal is used to indicate electromagnetic wave scattering feature information of a target object. The processor is configured to obtain location information of the transceiver. The location information is used to indicate relative location information between a reception point and a positioning label. The processor is further configured to perform electromagnetic wave imaging on the target object based on the electromagnetic wave scattering feature information and the location information.

With reference to the third aspect, the transceiver is configured to: collect electromagnetic echo signals at a plurality of moments, and output an electromagnetic echo signal corresponding to each of the plurality of moments to the processor. The processor is configured to obtain location information of reception points of electromagnetic echo signals at a plurality of moments. The processor is further configured to perform electromagnetic wave imaging on the target object based on a plurality of pieces of electromagnetic wave scattering feature information and a correspondence between all of a plurality of pieces of location information and the plurality of pieces of electromagnetic wave scattering feature information.

With reference to any one of the third aspect and the foregoing implementations of the third aspect, the plurality of moments at which the transceiver collects the electromagnetic echo signal meet a first period, and the plurality of moments at which the processor obtains the location information meet a second period. The first period is the same as the second period; or there is a multiple relationship between the first period and the second period.

With reference to any one of the third aspect and the foregoing implementations of the third aspect, the electromagnetic wave imaging apparatus further includes at least three sensors, and the processor is configured to: obtain relative location information between each of the at least three sensors and the positioning label, and obtain relative location information between the reception point and the positioning label based on relative location information between the at least three sensors and the positioning label and relative location information between the at least three sensors and the reception point.

With reference to any one of the third aspect and the foregoing implementations of the third aspect, the relative location information between the sensor and the positioning label is obtained based on distance information between the sensor and the positioning label.

With reference to any one of the third aspect and the foregoing implementations of the third aspect, the relative location information between the sensor and the positioning label is obtained based on angle information between the sensor and the positioning label.

With reference to any one of the third aspect and the foregoing implementations of the third aspect, the positioning label is at least one of the following: an identification point disposed on the target object, an identification point disposed in a specified range of the target object, and any feature point on the target object.

With reference to any one of the third aspect and the foregoing implementations of the third aspect, collection of the electromagnetic echo signal performed by the transceiver is synchronized with obtaining of the location information performed by the processor.

With reference to any one of the third aspect and the foregoing implementations of the third aspect, the transceiver is specifically configured to: transmit an electromagnetic wave, and receive an electromagnetic echo signal scattered by the target object.

With reference to any one of the third aspect and the foregoing implementations of the third aspect, the transceiver is specifically configured to receive an electromagnetic echo signal released by the target object.

According to a fourth aspect, an embodiment of this application provides a computer-readable storage medium. The medium includes a computer program. When the computer program runs on an apparatus, the apparatus is enabled to perform the electromagnetic wave imaging method according to any one of the second aspect and the implementations of the second aspect.

According to a fifth aspect, an embodiment of this application provides a computer program. The computer program is used to perform the electromagnetic wave imaging method according to any one of the second aspect and the implementations of the second aspect.

According to a sixth aspect, an embodiment of this application further provides a computer program product including executable instructions. When the computer program product runs, some or all steps of the method according to any one of the second aspect and the possible implementations of the second aspect are performed.

BRIEF DESCRIPTION OF THE DRAWINGS

To describe the technical solutions in embodiments of this application more clearly, the following briefly describes the accompanying drawings for describing embodiments. It is clear that the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

Figure 1:
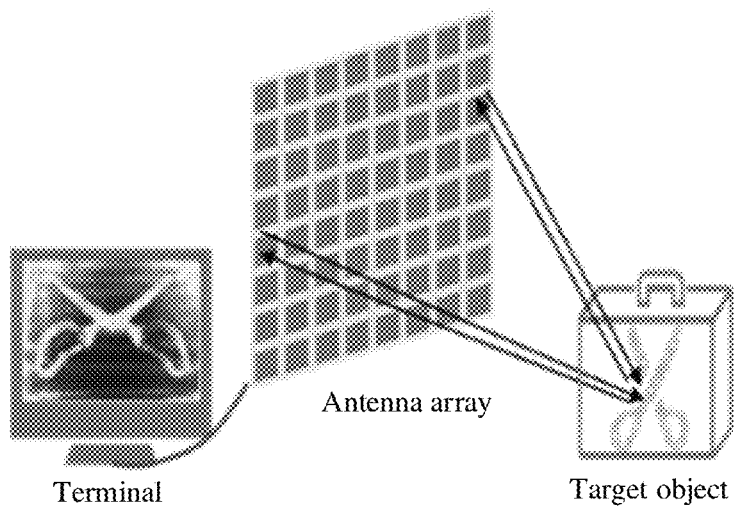
FIG. 1 is a schematic diagram of an electromagnetic wave imaging apparatus shown as an example.

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object and a second target object are used to distinguish between different target objects, but are not used to describe a specific order of the target objects.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the description of the embodiment of this application, unless otherwise stated, "a plurality of" means two or more than two. For example, "a plurality of processing units" means two or more processing units, and "a plurality of systems" means two or more systems.

To enable a person skilled in the art to better understand the technical solutions of this application, a possible background technology is first briefly described.

Electromagnetic Wave Imaging

Electromagnetic wave imaging is an imaging means in which an electromagnetic wave is used as an information carrier. A principle of electromagnetic wave imaging is to reconstruct a shape, a characteristic, or dielectric constant distribution of an object by actively or passively detecting a to-be-imaged target and a signal of a surrounding scattering field, to form an image. In the descriptions of embodiments of this application, the to-be-imaged target may also be referred to as a target object or the like. This is not limited in this application.

Because an electromagnetic wave band is less than an optical band, objects that cannot be penetrated by the optical band become transparent to the electromagnetic wave band, so that a perspective capability of the inside of the object is achieved. Therefore, electromagnetic wave imaging has extremely high application value in commercial and scientific fields such as lossless detection, security detection, and medical detection.

Imaging Effect Measurement Indicator

Spatial resolution is a main performance indicator for measuring an electromagnetic wave imaging effect, and specifically includes range resolution and azimuth resolution.

A theoretical calculation formula of the range resolution is as follows:

$$\delta_r = 0.885 \frac{c}{2B} \quad (1)$$

A theoretical calculation formula of the azimuth resolution is as follows:

$$\delta_a = 0.885 \frac{cD}{f_c L} \quad (2)$$

In the formulas, c indicates a speed of light, B indicates signal bandwidth, D indicates a distance between a to-be-imaged object and an imaging apparatus, $f_c$ indicates a carrier center frequency of an electromagnetic wave, and L indicates an effective aperture length of an antenna of the imaging apparatus.

Clearly, when D and $f_c$ are fixed, in other words, when an imaging environment does not change, the effective aperture length of the antenna of the imaging apparatus needs to be increased to improve the azimuth resolution. For example, if the imaging apparatus operates at 3 GHz, and the distance between the to-be-imaged object and the imaging apparatus is 0.5 m, to implement centimeter-level azimuth resolution, a required effective aperture length of the antenna is as follows:

$$L = 0.885 \frac{cD}{f_c \delta_a} = 0.885 \frac{3 \times 10^8 \times 0.5}{3 \times 10^9 \times 0.1} = 4.425 \text{ (meters)} \quad (3)$$

It can be learned that because of such an antenna size, the imaging apparatus becomes bulky and cannot be portably used.

Technical Means for Making an Electromagnetic Imaging Apparatus Portable/Miniaturized It can be learned from the foregoing descriptions that if an operating frequency of a device is increased from 3 GHz to 30 GHz, in a case of a same azimuth resolution requirement, a required effective aperture length of an antenna is reduced to 1/10, to be specific, 0.4425 meters.

Therefore, increasing the operating frequency of the electromagnetic imaging device, for example, making the electromagnetic imaging device operate in a millimeter wave (30 GHz to 100 GHz) or terahertz (100 GHz to 10 THz) band is one of effective technical means for implementing miniaturization of the electromagnetic imaging apparatus.
Synthetic Aperture Electromagnetic Imaging Currently, an imaging apparatus usually uses an antenna array. To be specific, some antenna elements are arranged in a plane array/linear array according to a specific rule, for example, at equal intervals of ½ of a wavelength. As shown in FIG. 1, the antenna array may scan a target object by using antennas in the array, and a terminal may perform electromagnetic wave imaging based on a scanning result of the antennas.

However, at a current component level, a real millimeter wave or terahertz antenna array is at risks of obtaining and costs. Therefore, an equivalent technical means is to use synthetic aperture electromagnetic imaging. To be specific, a virtual array is formed by a limited quantity of antenna elements by moving an imaging platform in space, and time is exchanged for space, so that an effect equivalent to a signal collection effect of a real array is achieved. The synthetic aperture electromagnetic imaging technology has two advantages. First, a real array is reduced to a single antenna or a small-sized antenna array to reduce an overall size of the antenna and an apparatus. Second, the foregoing risks of the real array are avoided.

However, there is a new technical challenge in synthetic aperture imaging. To implement synthetic aperture electromagnetic imaging, positioning precision of a moving track of the imaging platform needs to be relatively high, and a positioning error needs to be controlled at an order of magnitude of a wavelength. Only in this way, coherent processing of signals collected at different spatial locations can be implemented. If the positioning error is relatively large, imaging cannot be performed. For example, for an imaging apparatus (namely, an electronic device) whose operating frequency is 60 GHz, a positioning error needs to be controlled at an order of magnitude of 4 millimeters. For an apparatus whose operating frequency is 3 GHz, a positioning error of the apparatus needs to be controlled only at an order of magnitude of 8 centimeters.

To resolve the error problem, in an example, the conventional technology provides a synthetic aperture electromagnetic imaging method that is based on a mechanical scanner or a mechanical scanning arm (referred to as a mechanical arm). An electromagnetic imaging module is disposed on a mechanical scanner or a mechanical scanning arm, and a moving track of the mechanical scanner or the mechanical scanning arm and a sampling moment of the electromagnetic imaging module are preset to collect an electromagnetic signal at a specified spatial location, to implement synthetic aperture electromagnetic imaging.

Because it is known that a moving location of the mechanical scanner or the mechanical arm is precise, positioning precision can be ensured in this manner.

However, because a volume of the mechanical scanner or the mechanical arm is usually relatively large, a requirement for a portable and miniaturized device cannot be met.

In another example, the conventional technology provides a synthetic aperture electromagnetic imaging apparatus that is based on an optical tracking system. The apparatus includes two parts: a synthetic aperture electromagnetic imaging module and a commercial optical tracking system.

The optical tracking system includes an external infrared optical camera and a plurality of positioning labels. The positioning label and the electromagnetic imaging module are disposed on one mechanical part, and a relative location between the positioning label and the electromagnetic imaging module is fixed. The infrared optical camera is fastened around an operation console, and is separated from the foregoing mechanical part.

During operation, the infrared optical camera captures spatial positions of the positioning labels at a signal collection moment of the imaging module, then calculates a spatial centroid of the positioning labels, and uses the spatial centroid as a location of the electromagnetic imaging module.

However, because the external operation console needs to be constructed for the optical tracking system, portability of the entire synthetic aperture imaging apparatus is affected, and a user requirement for a portable and miniaturized device cannot be met.

This application provides a portable electromagnetic wave imaging method. A moving track of an electronic device (which may also be referred to as an electromagnetic wave imaging apparatus) may be precisely positioned by using a positioning label, to obtain a correspondence between an electromagnetic echo signal and a location on the moving track of the electronic device, so that requirements for portability and miniaturization are met while a success rate of electromagnetic wave imaging is ensured.

Figure 2:
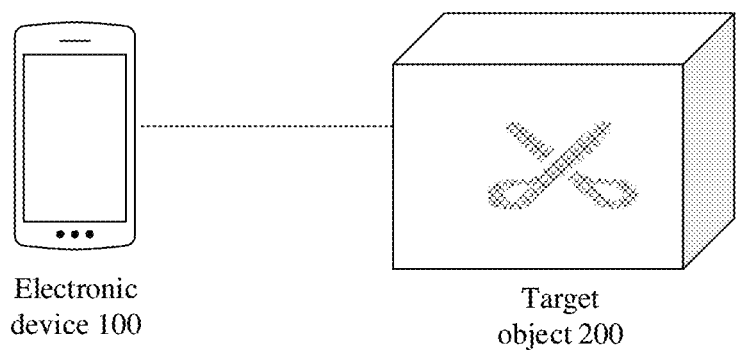
FIG. 2 is a schematic diagram of an application scenario according to an embodiment of this application.

Before technical solutions of embodiments of this application are described, an application scenario of embodiments of this application is first described with reference to the accompanying drawings. FIG. 2 is a schematic diagram of an application scenario according to an embodiment of this application. The application scenario includes an electronic device wo and a target object 200. It should be noted that in an actual application, there may be one or more electronic devices and target objects. Quantities of electronic devices and target objects in the application scenario shown in FIG. 2 are only an adaptive example. This is not limited in this application. An application scenario in this application may be a living entertainment scenario, a security detection scenario, a medical detection scenario, or the like. This is not limited in this application.

The electronic device in FIG. 2 may be a terminal, which may also be referred to as a mobile station, a subscriber unit, a station, terminal equipment (TE), or the like. For example, the electronic device may be a cellular phone, a personal digital assistant (PDA), a handheld device, a tablet computer (pad), a handheld device, a computing device or another processing device connected to a wireless modem, a vehicle-mounted device, a wearable device, a virtual reality (VR) terminal, an augmented reality (AR) terminal, a terminal in industrial control, a terminal in self driving, a terminal in telemedicine (remote medical), a terminal in a smart grid, a terminal in transportation safety, a terminal in a smart city, or a terminal in a smart home. This is not limited herein.

Figure 3:
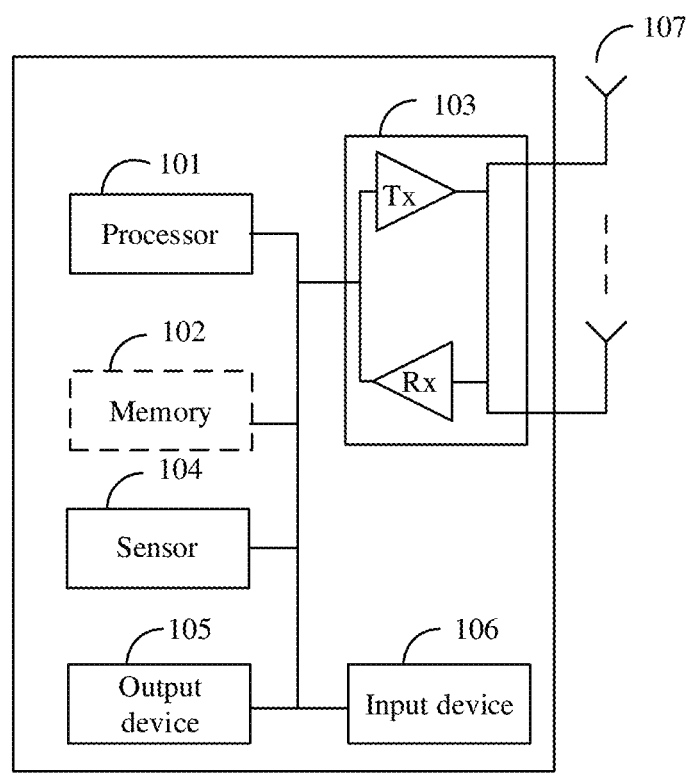
FIG. 3 is a schematic diagram of a structure of an electronic device shown as an example.

FIG. 3 is a schematic diagram of a structure of an electronic device. In FIG. 3, the electronic device includes at least one processor 101, at least one transceiver 103, and at least three sensors 104. Optionally, the electronic device may further include at least one memory 102. The processor 101, the memory 102, the transceiver 103, and the sensor 104 are connected. Optionally, the electronic device may further include an output device 105, an input device 106, and one or more antennas 107. The antenna 107 is connected to the transceiver 103, and the output device 105 and the input device 106 are connected to the processor 101.

The processor 101 may be a baseband processor, or may be a CPU, and the baseband processor and the CPU may be integrated together or separated.

The processor 101 may be configured to implement various functions for the electronic device, for example, be configured to process a communication protocol and communication data, or be configured to control the entire electronic device, execute a software program, and process data of the software program, or be configured to assist in completing a computing processing task, for example, processing graphics, images, or audio. Alternatively, the processor 101 is configured to implement one or more of the foregoing functions.

A memory, for example, the memory 102, in this embodiment of this application may include at least one of the following types: a read-only memory (ROM), another type of static storage device that can store static information and instructions, a random access memory (RAM), another type of dynamic storage device that can store information and instructions, and an electrically erasable programmable read-only memory (EEPROM). In some scenarios, the memory may be alternatively a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, the memory is not limited thereto.

The memory 102 may independently exist, and is connected to the processor 101. Optionally, the memory 102 and the processor 101 may be integrated together, for example, integrated into one chip. The memory 102 can store program code for executing the technical solutions in embodiments of this application, and the execution is controlled by the processor 101. The executed computer program code may also be considered as a driver of the processor 101. For example, the processor 101 is configured to execute the computer program code stored in the memory 102, to implement the technical solutions in embodiments of this application. Optionally, the memory 102 may be located outside a chip, and is connected to the processor 101 by using an interface.

The transceiver 103 may be configured to support an electromagnetic wave signal in being received or sent, and the transceiver 103 may be connected to the antenna 107. The transceiver 103 includes a transmitter Tx and a receiver Rx. Specifically, the one or more antennas 107 may receive an electromagnetic wave signal. The receiver Rx of the transceiver 103 is configured to: receive the electromagnetic wave signal from the antenna, process and convert the electromagnetic wave signal, and provide a converted electromagnetic wave signal to the processor 101, so that the processor 101 performs further processing such as demodulation processing and decoding processing on the converted electromagnetic wave signal.

The output device 105 communicates with the processor 101, and may display information in a plurality of manners. For example, the output device 105 may be a liquid crystal display (LCD), a light emitting diode (LED) display device, a cathode ray tube (CRT) display device, or a projector. The input device 106 communicates with the processor 101, and may receive a user input in a plurality of manners. For example, the input device 106 may be a mouse, a keyboard, a touchscreen device, or a sensor device.

There are at least three sensors 104. In an example, the sensor 104 may be a ranging sensor, configured to obtain distance information between a positioning label and the sensor or a parameter used to indirectly indicate distance information between the sensor and a target object. For example, the parameter used to indirectly indicate the distance information between the sensor and the target object may be a parameter such as signal transmission duration. For example, the ranging sensor may be a femtosecond sensor. In another example, the sensor 104 may be alternatively a sensor in an optical camera, configured to collect an image of a target object. In still another example, the sensor 104 may be a goniometric sensor, configured to obtain angle information between a positioning label and a target object. It should be noted that the sensor types in this application are merely examples. In addition to the femtosecond sensor and the goniometric sensor mentioned in this application, the sensor may be any component that can enable the electronic device to directly or indirectly obtain a distance between the sensor and the positioning label. In this embodiment of this application, a plurality of sensors are distributed in the electronic device.

Figure 4:
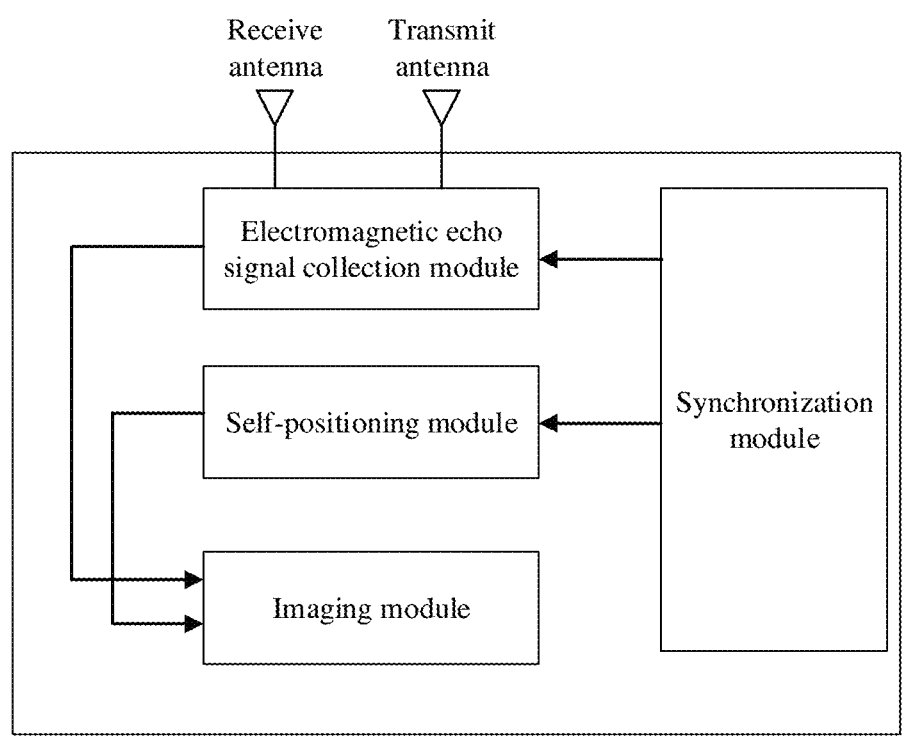
FIG. 4 is a block diagram of a software structure of an electronic device shown as an example.

FIG. 4 is a block diagram of a software structure of an electronic device 100 shown as an example. Referring to FIG. 4, the electronic device 100 includes but is not limited to an electromagnetic echo signal collection module, a self-positioning module, and an imaging module. Optionally, the electronic device 100 further includes a synchronization module. Optionally, each module may be implemented by a chip or a circuit. This is not limited in this application. It should be noted that FIG. 4 shows only some modules in the electronic device 100. Names and a quantity of modules are not limited in this application.

Figure 5:
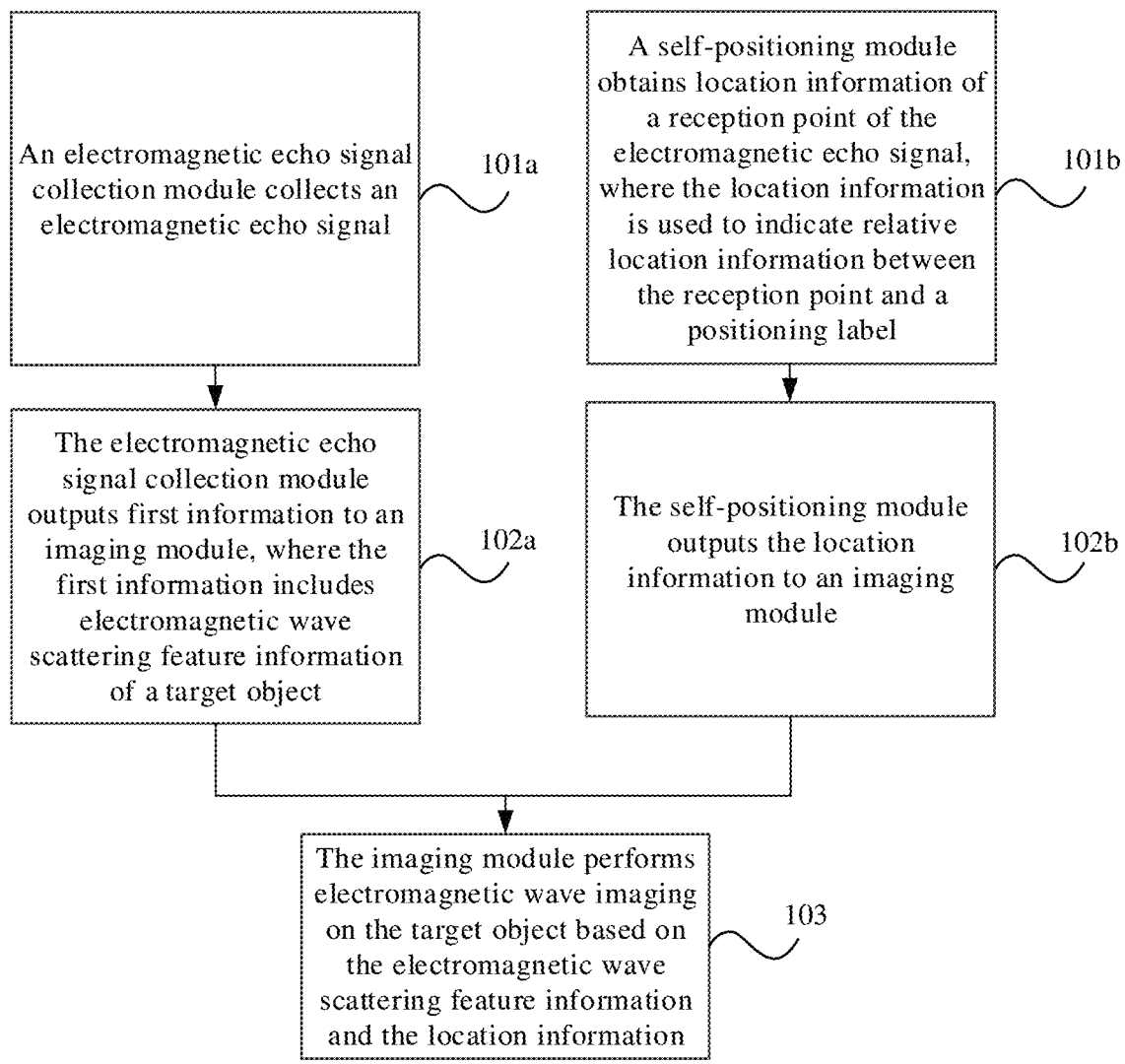
FIG. 5 is a schematic flowchart of an electromagnetic wave imaging method according to an embodiment of this application.

With reference to FIG. 4, FIG. 5 is a schematic flowchart of an electromagnetic wave imaging method according to an embodiment of this application. In FIG. 5.

Step 101a: An electromagnetic echo signal collection module collects an electromagnetic echo signal.

Specifically, the electromagnetic echo signal collection module may collect the electromagnetic echo signal by using a transceiver, for example, an antenna, in an electronic device. Optionally, the electromagnetic echo signal is used to indicate electromagnetic wave scattering feature information of a target object. It should be noted that the antenna in this application is a receive antenna in FIG. 4, and this is not repeated below.

In a possible implementation, the electromagnetic echo signal collection module may actively collect the electromagnetic echo signal. Specifically, the electromagnetic echo signal collection module transmits an electromagnetic wave, and receives an electromagnetic echo signal scattered by the target object.

In another possible implementation, the electromagnetic echo signal collection module may passively collect the electromagnetic echo signal. Specifically, the target object may release an electromagnetic echo signal, and the electromagnetic echo signal collection module receives the electromagnetic echo signal released by the target object. Optionally, the electromagnetic echo signal released by the target object may be a thermal radiation signal.

Step 102a: The electromagnetic echo signal collection module outputs first information to an imaging module, where the first information includes the electromagnetic wave scattering feature information of the target object.

Specifically, after obtaining the electromagnetic echo signal, the electromagnetic echo signal collection module inputs the first information to the imaging module. The first information includes the electromagnetic wave scattering feature information of the target object.

In an example, the first information may be the electromagnetic echo signal. Specifically, the electromagnetic echo signal collection module sends the electromagnetic echo signal that includes the electromagnetic wave scattering feature information of the target object to the imaging module. The imaging module may perform signal processing on the electromagnetic echo signal to parse out the electromagnetic wave scattering feature information of the target object that is included in the electromagnetic echo signal. In another example, the first information may be the electromagnetic wave scattering feature information of the target object. Specifically, the electromagnetic echo signal collection module may perform signal processing on the electromagnetic echo signal to obtain the electromagnetic wave scattering feature information of the target object, and output the electromagnetic wave scattering feature information of the target object to the imaging module.

Step 101b: A self-positioning module obtains location information of a reception point of the electromagnetic echo signal, where the location information is used to indicate relative location information between the reception point and a positioning label.

Specifically, in this application, the positioning label may be preset, and a location of the positioning label is used as an anchor in space, so that in a moving process of the electronic device, relative location information between the electronic device (specifically, the reception point of the electromagnetic wave signal) and the positioning label may be obtained, thereby implementing precise self-positioning.

The following describes a concept of the positioning label. Specifically, the positioning label is a label with a fixed location in an electromagnetic wave imaging process. Optionally, in a process of performing electromagnetic wave imaging on a same target object a plurality of times or performing electromagnetic wave imaging on different target objects, locations of the positioning label may be the same or different. This is not limited in this application.

In a possible implementation, the positioning label may be an entity component, and is disposed on the target object or near the target object. In an example, the positioning label may be active, to be specific, the positioning label actively releases a light source or a signal. In another example, the positioning label may be passive, and may reflect light emitted to the positioning label. In this application, an example in which the positioning label is a passive component is used for description. For a specific example, refer to Scenario 1.

In another possible implementation, the positioning label may be a virtual label, for example, may be any feature point on or near the target object. For a specific example, refer to Scenario 2.

Still referring to FIG. 5, specifically, in this application, at least three sensors are disposed in the electronic device. As described above, each sensor may obtain distance information between the sensor and the positioning label or a related parameter used to indirectly indicate the distance information between the sensor and the positioning label.

The self-positioning module may obtain distance information or related parameters of the at least three sensors. Optionally, if the self-positioning module obtains the related parameter used to indirectly indicate the distance information between the sensor and the positioning label, the self-positioning module may obtain distance information between the sensor and the target object based on the related parameter.

Correspondingly, the self-positioning module may obtain a relative location between each sensor and the positioning label based on obtained distance information between the sensor and the positioning label.

Then the self-positioning module may obtain a relative location between the reception point of the electromagnetic echo signal and the positioning label based on the relative location between each sensor and the positioning label and relative locations between the at least three sensors and the reception point of the electromagnetic echo signal. For example, the relative location between the sensor and the reception point of the electromagnetic echo signal is fixed, and a specific value may be obtained through measurement.

It should be noted that the reception point of the electromagnetic echo signal in this embodiment of this application may be the transceiver in the electronic device, for example, the antenna in the electronic device.

Step 102b: The self-positioning module outputs the location information to the imaging module.

Specifically, after obtaining the location information, to be specific, the relative location between the reception point of the electromagnetic echo signal and the positioning label, the self-positioning module outputs the location information to the imaging module.

It should be noted that the foregoing uses an example in which the electromagnetic echo signal collection module and the self-positioning module perform actions once for description. Actually, the electromagnetic echo signal collection module and the self-positioning module may perform the foregoing actions at a plurality of moments. To be specific, the electromagnetic echo signal collection module may collect electromagnetic echo signals at a plurality of moments, and the self-positioning module may obtain location information at a plurality of moments.

Optionally, the electromagnetic echo signal collection module and the self-positioning module perform corresponding actions based on a specific time sequence (which may also be understood as a period). For example, the plurality of moments at which the electromagnetic echo signal collection module collects the electromagnetic echo signal meet a first period, in other words, an interval between the plurality of moments meets the first period, which may mean that each period trigger moment of the first period corresponds to a moment in the plurality of moments. For example, the plurality of moments at which the self-positioning module obtains the location information meet a second period, in other words, an interval between the plurality of moments meets the second period, which may mean that each period trigger moment of the second period corresponds to a moment in the plurality of moments. For example, the electromagnetic echo signal collection module may collect the electromagnetic echo signal based on the first period. To be specific, the electromagnetic echo signal collection module performs step Iola, in other words, collects the electromagnetic echo signal, at each period trigger moment of the first period. The self-positioning module may collect the electromagnetic echo signal based on the second period. Specifically, the self-positioning module performs step 101b, in other words, obtains the location information, at each period trigger moment of the second period.

In an example, the first period may be the same as the second period. To be specific, step Iola and step 101b are simultaneously performed at each period trigger moment.

In another example, there is a multiple relationship between the first period and the second period. In an example, the multiple relationship may be an integer multiple. For example, the first period is three times the second period. In another example, the multiple relationship may be alternatively a non-integer multiple. For example, the first period is ⅓ times the second period (which may also mean that the second period is three times the first period), or the first period is ⅔ times the second period. This is not limited in this application.

Figure 6:
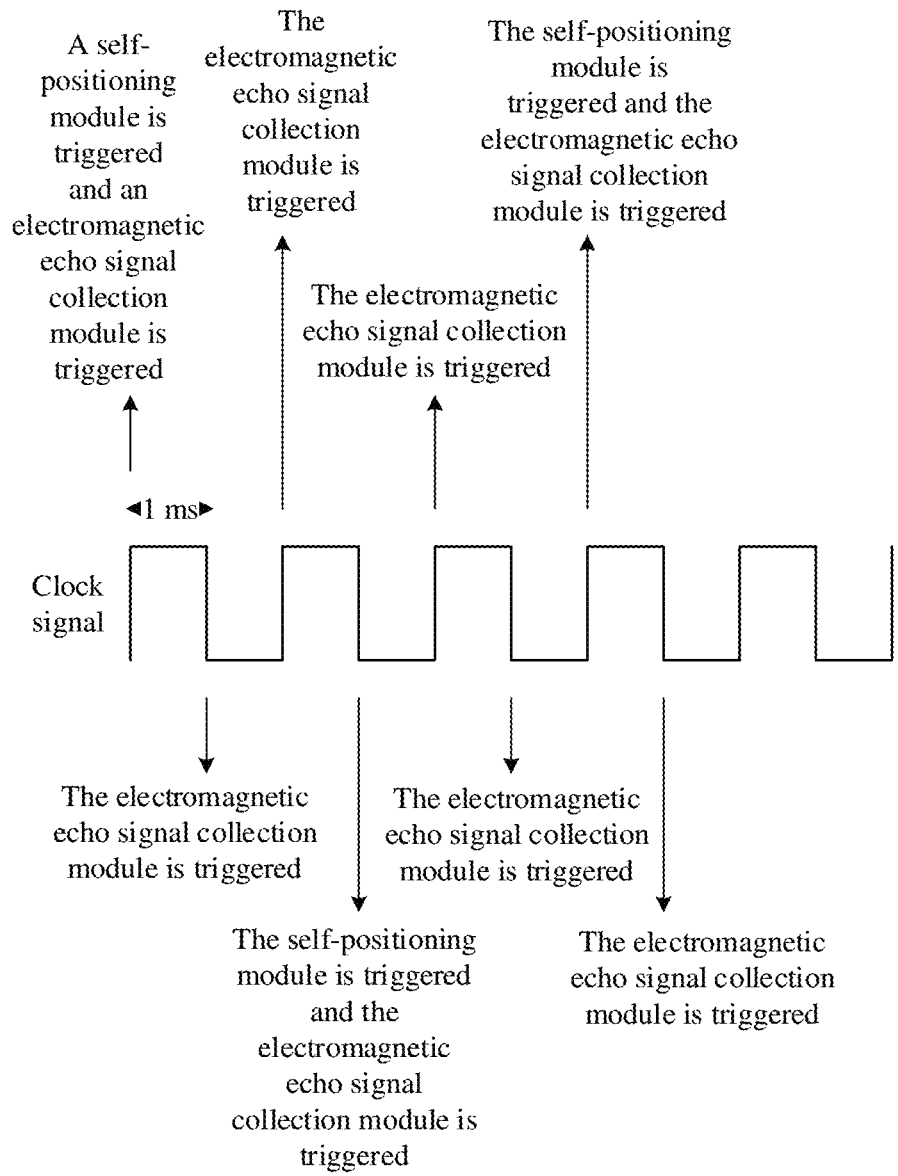
FIG. 6 is a schematic diagram of a synchronization manner shown as an example.

Optionally, when the first period and the second period are different, period trigger moments of the first period and the second period are aligned. For example, if period duration of the first period is 1 ms, and period duration of the second period is 3 ms, the electromagnetic echo signal collects the electromagnetic echo signal every 1 ms, and the self-positioning module obtains the location information every 3 ms. When the self-positioning module collects the location information, the electromagnetic echo signal collection module collects the electromagnetic echo signal. To better understand the process, a concept of a clock may be introduced. Specifically, the electronic device has a clock source, configured to generate a clock signal. Both the electromagnetic echo signal collection module and the self-positioning module perform operations based on the clock signal. FIG. 6 shows execution procedures of the self-positioning module and the electromagnetic echo signal collection module when the periods are different. Referring to FIG. 6, the electromagnetic echo signal collection module collects the electromagnetic echo signal on the first clock edge, and an interval between clock signals is 1 ms. In other words, the electromagnetic echo signal collection module is triggered on each clock edge to perform the action of collecting the electromagnetic echo signal. The self-positioning module is triggered on the third clock edge and a clock edge that is a multiple of 3 to perform the action of obtaining the location information. In other words, when the periods are different, it may also be considered that the electromagnetic echo signal collection module and the self-positioning module synchronously perform corresponding actions.

Optionally, in this application, to implement synchronization between the self-positioning module and the electromagnetic echo signal collection module, a synchronization module may send control signals to the self-positioning module and the electromagnetic echo signal module, to indicate the self-positioning module and the electromagnetic echo signal module to synchronously perform response operations. For example, the synchronization module may send a first control signal to the electromagnetic echo signal collection module to indicate to trigger the electromagnetic echo signal collection module and the first period, and the synchronization module may send a second control signal to the self-positioning module to indicate to trigger the self-positioning module and the second period. The self-positioning module and the electromagnetic echo signal collection module implement synchronization based on the respective periods and clock signals in response to the received control signals. Optionally, in different electromagnetic wave imaging processes, the first period and/or the second period may be dynamically set, and a current period may be indicated to the electromagnetic echo signal collection module and/or the self-positioning module by using the first control signal and/or the second control signal.

Optionally, the first period and the second period may be preconfigured, in other words, the first period and the second period do not need to be indicated by the synchronization module, and the self-positioning module and the electromagnetic echo signal collection module may perform corresponding operations based on the preset periods.

Step 103: The imaging module performs electromagnetic wave imaging on the target object based on the electromagnetic wave scattering feature information and the location information.

Figure 7:
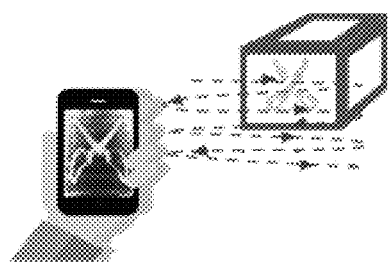
FIG. 7 is a schematic diagram of a moving track shown as an example.

Specifically, after receiving the first information, the imaging module may obtain the electromagnetic wave scattering feature information included in the first information, and perform electromagnetic wave imaging on the target object based on the electromagnetic wave scattering feature information and the received location information. In an example, the electronic device may display, by using a screen, a result of electromagnetic wave imaging. As shown in FIG. 7, a dashed line in FIG. 7 is a schematic diagram of simulating a running track of the electronic device. In another example, the electronic device may alternatively display a result of electromagnetic wave imaging by using another electronic device communicatively connected (wiredly connected or wirelessly connected) to the electronic device. For example, the electronic device may send the result of electromagnetic wave imaging to another electronic device, and the another electronic device may display the received result of electromagnetic wave imaging.

As described above, the electromagnetic echo signal collection module and the self-positioning module periodically perform corresponding actions. In other words, the electromagnetic echo signal module and the self-positioning module input corresponding parameters (including the electromagnetic wave scattering feature information and the location information) to the imaging module based on the respective periods of the electromagnetic echo signal module and the self-positioning module. The imaging module may perform electromagnetic wave imaging on the target object based on a plurality of pieces of obtained electromagnetic wave scattering feature information, a plurality of pieces of obtained location information, and a correspondence between the plurality of pieces of electromagnetic wave scattering feature information and the plurality of pieces of location information.

It should be noted that the correspondence is a time correspondence between the plurality of pieces of electromagnetic wave scattering feature information and the plurality of pieces of location information. As described above, the self-positioning module and the electromagnetic echo signal collection module periodically obtain corresponding information, and execution actions of the self-positioning module and the electromagnetic echo signal collection module are synchronous. Therefore, there is a time correspondence between the electromagnetic wave scattering feature information and the location information. For example, at a moment $t_1$, the electromagnetic echo signal collection module collects a first electromagnetic echo signal, and outputs the first electromagnetic echo signal to the imaging module. In addition, at this moment, the self-positioning system obtains first location information, and outputs the first location information to the imaging module. At a moment $t_2$, the electromagnetic echo signal collection module collects a second electromagnetic echo signal, and outputs the second electromagnetic echo signal to the imaging module. In addition, at this moment, the self-positioning system obtains second location information, and outputs the second location information to the imaging module. In this case, the imaging module determines that the first electromagnetic echo signal corresponds to the first location information and the second electromagnetic echo signal corresponds to the second location information.

Optionally, the imaging module may determine the time correspondence between the plurality of pieces of electromagnetic wave scattering feature information and the plurality of pieces of location information based on reception moments.

Optionally, the electromagnetic echo signal collection module may output first information at a plurality of moments and a timestamp corresponding to each piece of first information to the imaging module, and the self-positioning module may output location information at a plurality of moments and a timestamp corresponding to each piece of location information to the imaging module. Correspondingly, the imaging module may determine a correspondence between the plurality of pieces of first information and the plurality of pieces of location information based on the timestamp of the first information and the timestamp of the location information. For example, the timestamp may be system time or may be relative time (for example, time relative to a control signal trigger moment). This is not limited in this application.

It should be noted that, as described above, the execution periods of the electromagnetic echo signal collection module and the self-positioning module may be different. In other words, not all of the plurality of pieces of location information and the plurality of pieces of electromagnetic wave scattering feature information that are obtained by the imaging module correspond to each other. For example, the imaging module may estimate a moving track based on an interpolation algorithm, so that each piece of electromagnetic wave scattering feature information corresponds to corresponding location information. In addition, if the location information obtained by the imaging module is more than the plurality of pieces of electromagnetic wave scattering feature information, the imaging module may perform a downsampling operation on the moving track based on an extraction algorithm, so that the pieces of electromagnetic wave scattering feature information are in a one-to-one correspondence with the positioning location information. For a specific manner, refer to the conventional technology. Details are not described in this application.

In the descriptions of this embodiment of this application, a manner in which each time the self-positioning module and the electromagnetic echo signal collection module obtain corresponding data or signals, the self-positioning module and the electromagnetic echo signal collection module output the response data or signals to the imaging module is used as an example for description. In another embodiment, alternatively, after obtaining a plurality of pieces of data or a plurality of signals, the self-positioning module and the electromagnetic echo signal collection module may output the data or the signals and corresponding time information to the imaging module, and the imaging module may determine the correspondence between the location information and the electromagnetic wave scattering feature information based on the time information of the signals or the data, and perform an electromagnetic wave imaging process on the target object.

In a possible implementation, the imaging module may perform an electromagnetic wave imaging process after obtaining all data or signals input by the electromagnetic echo signal collection module and the self-positioning module.

In another possible implementation, the imaging module may perform an electromagnetic wave imaging process after obtaining sufficient data or signals input by the electromagnetic echo signal collection module and the self-positioning module.

In conclusion, in this application, the electronic device implements precise self-positioning based on the relative location between the reception point and the positioning label, and in addition, flexibility of the electronic device is improved, and requirements for portability and miniaturization are met.

Scenario 1

Figure 8:
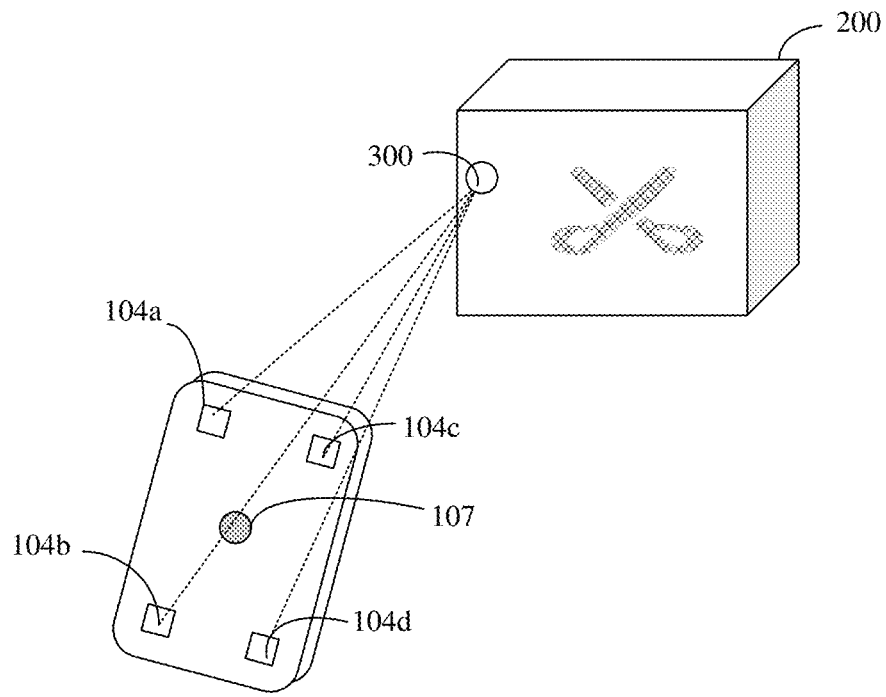
FIG. 8 is a schematic diagram of an application scenario according to an embodiment of this application.

FIG. 8 is a schematic diagram of an application scenario shown as an example. Referring to FIG. 8, for example, an electronic device 100 is a mobile phone, sensors 104, namely, 104a, 104b, 104c, and 104d, are disposed in the mobile phone, and a transceiver 107 is further disposed in the mobile phone. For example, the transceiver is an antenna. For example, in this embodiment, the sensor is a femtosecond sensor. It should be noted that a quantity and locations of sensors shown in this embodiment and the following embodiments and a relative location between the sensor and the antenna are examples. This is not limited in this application, and this is not repeated below.

Still referring to FIG. 8, for example, a positioning label 300 is a peripheral label. In this embodiment, the positioning label 300 is disposed on a target object 200. For example, the target object is a carton, and scissors are placed in the carton. In this embodiment, the sensor measures a distance according to an optical principle. Therefore, no blocking needs to be ensured between the sensor 104 and the positioning label 300. It should be noted that a location of the positioning label is fixed in an imaging process.

Figure 9:
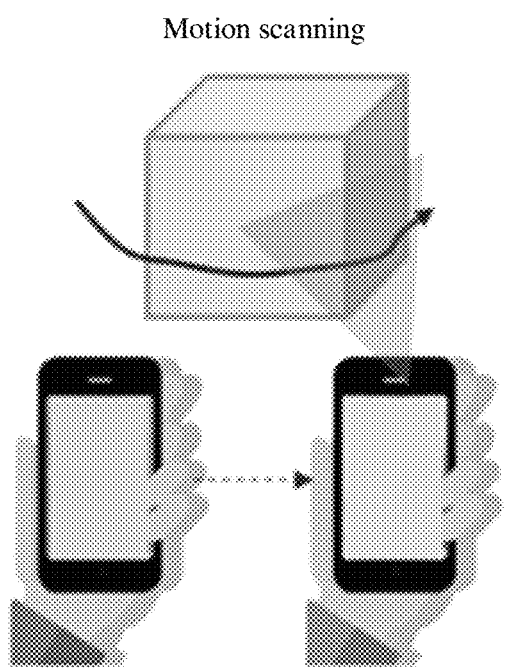
FIG. 9 is a schematic diagram of a scanning manner shown as an example.

For example, the mobile phone 100 enables an electromagnetic wave imaging procedure in response to a received user instruction, to perform motion scanning on the target object 200. Without loss of generality, a moving track of the mobile phone in the motion scanning process is not specifically agreed upon in this embodiment. For example, a scanning manner shown in FIG. 9 may be used. It should be noted that a moving speed, a moving direction, and the like of the mobile phone may be agreed upon based on performance of the mobile phone. This is not limited in this application. A person skilled in the art should understand that longer scanning duration of the mobile phone indicates a richer track and more precise imaging.

Figure 10:
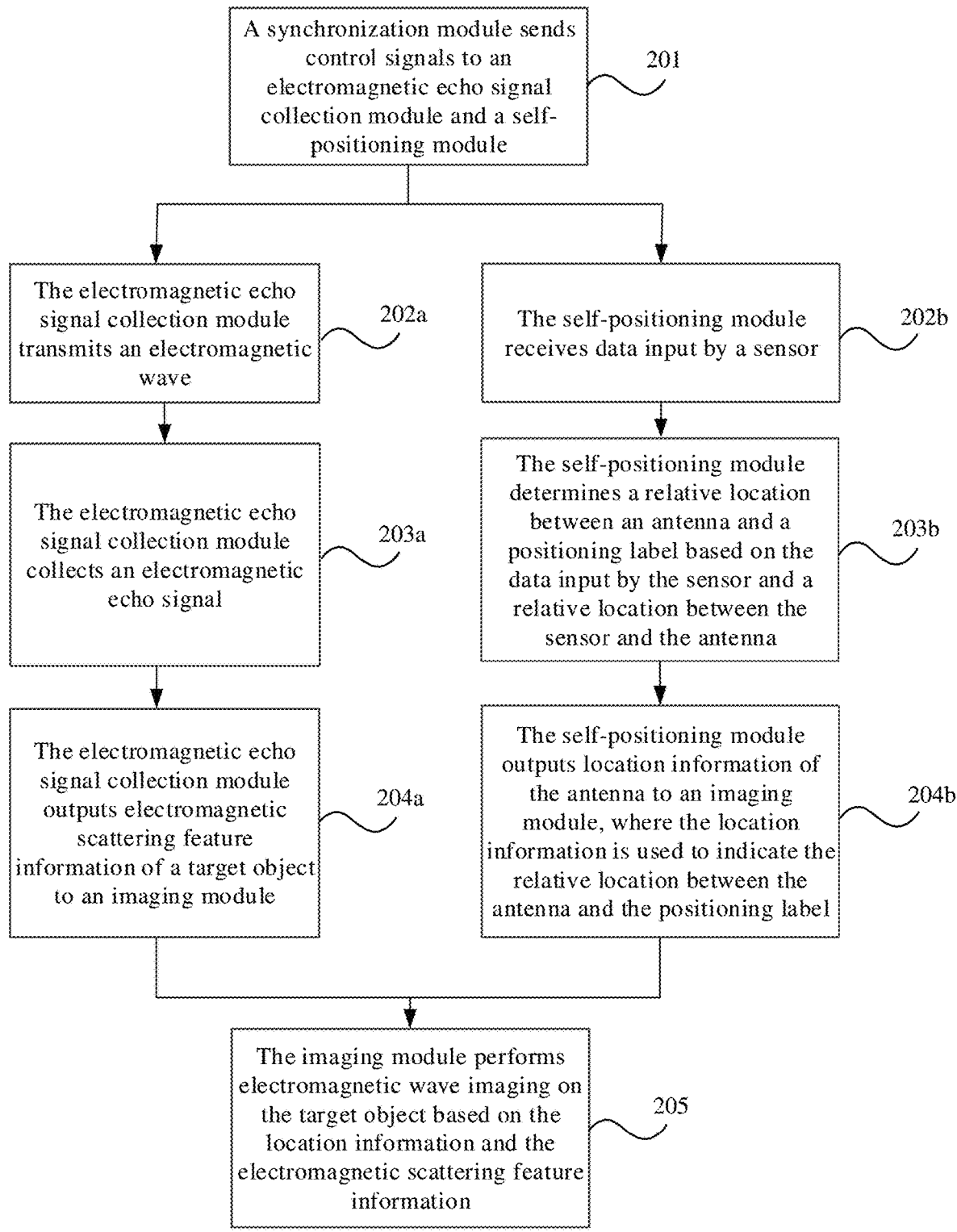
FIG. 10 is a schematic flowchart of an electromagnetic wave imaging method according to an embodiment of this application.

With reference to FIG. 8, FIG. 10 is a schematic flowchart of electromagnetic wave imaging according to an embodiment of this application. In FIG. 10.

Step 201: A synchronization module sends control signals to an electromagnetic echo signal collection module and a self-positioning module.

For example, the synchronization module separately sends a first control signal to the electromagnetic echo signal collection module, and sends a second control signal to the self-positioning module. The first control signal is used to indicate to trigger the electromagnetic echo signal collection module and indicate a first period. The second control signal is used to indicate to trigger the self-positioning module and indicate a second period.

For example, in this embodiment, an example in which the first period is the same as the second period and period duration is 3 ms is used for description, and a time sequence may be represented as i=1, 2, . . . , m.

Step 202a: The electromagnetic echo signal collection module transmits an electromagnetic wave.

For example, in response to the received first control signal, the electromagnetic echo collection module sends the electromagnetic wave at each moment $t_i$ by using an antenna 107.

Step 203a: The electromagnetic echo signal collection module collects an electromagnetic echo signal.

For example, after the electromagnetic wave transmitted by the electromagnetic echo signal collection module by using the antenna collides with a target object, the electromagnetic echo signal, which may also be referred to as an electromagnetic scattering echo signal, is generated. The electromagnetic echo signal is used to indicate electromagnetic scattering feature information of the target object.

For example, in this embodiment, the electromagnetic echo signal collection module collects the electromagnetic echo signal at each moment $t_i$ based on the time sequence (namely, the first period) delivered by the synchronization module.

The electromagnetic echo signal collection module performs signal processing on the collected electromagnetic echo signal to obtain the electromagnetic scattering feature information of the target object. For example, electromagnetic scattering feature information obtained by the electromagnetic echo signal collection module at different moments $t_i$ is $\rho_i$.

Step 204a: The electromagnetic echo signal collection module outputs the electromagnetic scattering feature information of the target object to an imaging module.

Step 202b: The self-positioning module receives data input by a sensor.

For example, sensors (for example, including sensors 104a, 104b, 104c, and 104d) in this embodiment are femtosecond sensors. The sensor may transmit an optical signal, and receive an optical signal reflected by a positioning label, to obtain a time difference Δt between the transmitted optical signal and the received optical signal. The value may also be understood as the foregoing parameter used to indirectly indicate a distance between the sensor and the positioning label. The self-positioning module may read, at different moments $t_i$, time differences $\Delta t_i$ obtained by the sensors. In other words, the self-positioning module may obtain at least three $\Delta t_i$ at a moment $t_i$. For example, in this embodiment, at the moment $t_i$, the self-positioning module may obtain $\Delta t_{ai}$ corresponding to the sensor 104a, $\Delta t_{bi}$ corresponding to the sensor 104b, $\Delta t_{ci}$ corresponding to the sensor 104c, and $\Delta t_{di}$ corresponding to the sensor 104d.

Step 203b: The self-positioning module determines a relative location between the antenna and the positioning label based on the data input by the sensor and a relative location between the sensor and the antenna.

Specifically, the self-positioning module obtains distance information between each sensor and the positioning label based on a time difference between each sensor and the positioning label, and further determines location information of the positioning label in space based on the distance information between each sensor and the positioning label. The self-positioning module may obtain a relative location between each sensor and the positioning label based on the location information of the positioning label in space. Because a relative location between each sensor and the antenna is known, the self-positioning module may obtain the relative location between the antenna and the positioning label based on the relative location between each sensor and the positioning label and the relative location between each sensor and the antenna.

Figure 11:
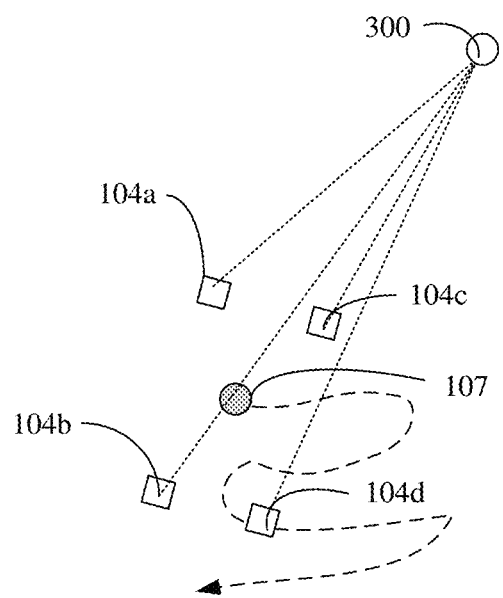
FIG. 11 is a schematic diagram of a moving track shown as an example.

The foregoing manner of obtaining the relative location between the antenna and the positioning label is described in detail below. Specifically, FIG. 11 is a schematic diagram of a moving track when the sensor and the antenna move with a mobile phone. Referring to FIG. 11, specifically, it is assumed that coordinate values of the antenna at the moment $t_i$ are $(x_i, y_i, z_i)$, and the positioning label is denoted as a coordinate origin (0, 0, 0). In addition, relative locations between the sensors (including the sensors 104a, 104b, 104c, and 104d) and the antenna are known and are separately denoted as offset$_{ai}$=($\Delta x_{ai}$, $\Delta y_{ai}$, $\Delta z_{ai}$), offset$_{bi}$=($\Delta x_{bi}$, $\Delta y_{bi}$, $\Delta z_{bi}$), offset$_{ci}$=($\Delta x_{ci}$, $\Delta y_{ci}$, $\Delta z_{ci}$), and offset$_{di}$=($\Delta x_{di}$, $\Delta y_{di}$, $\Delta z_{di}$). In this case, locations of the sensors 104a, 104b, 104c, and 104d at the moment $t_i$ may be respectively represented as $(x_i+\Delta x_{ai}, y_i+\Delta y_{ai}, z_i+\Delta z_{ai})$, $(x_i+\Delta x_{bi}, y_i+\Delta y_{bi}, z_i+\Delta z_{bi})$, $(x_i+\Delta x_{ci}, y_i+\Delta y_{ci}, z_i+\Delta z_{ci})$, and $(x_i+\Delta x_{di}, y_i+\Delta y_{di}, z_i+\Delta z_{di})$.

For example, the self-positioning module may obtain a location (namely, coordinates) of the antenna at the moment $t_i$ based on a time of arrival (TOA) algorithm.

For example, the self-positioning module may calculate $P_i=(x_i, y_i, z_i)$ based on the following formula:

$$\begin{cases} C \cdot \Delta t_{ai} = \sqrt{(x_i + \Delta x_{ai})^2 + (y_i + \Delta y_{ai})^2 + (z_i + \Delta z_{ai})^2} \\ C \cdot \Delta t_{bi} = \sqrt{(x_i + \Delta x_{bi})^2 + (y_i + \Delta y_{bi})^2 + (z_i + \Delta z_{bi})^2} \\ C \cdot \Delta t_{ci} = \sqrt{(x_i + \Delta x_{ci})^2 + (y_i + \Delta y_{ci})^2 + (z_i + \Delta z_{ci})^2} \end{cases} \quad (4)$$

It should be noted that the calculation manner in the foregoing embodiment is merely an example. After obtaining the relative location between each sensor and the positioning label and the relative location between each sensor and the antenna, the self-positioning module may calculate the relative location between the antenna and the positioning label based on any feasible manner, for example, based on a time difference of arrival (TDOA) algorithm. This is not limited in this application.

Step 204b: The self-positioning module outputs location information of the antenna to the imaging module, where the location information is used to indicate the relative location between the antenna and the positioning label.

For example, after obtaining the relative location between the antenna and the positioning label, the self-positioning module may output the relative location information to the imaging module.

It should be noted that a processing delay and a transmission delay of each module in this application are known, and each module may perform adjustment based on the known delays, so that when start steps (namely, step 202a and step 202b) are synchronous, input steps (namely, step 204a and step 204b) are also synchronous. For a specific adjustment manner, refer to the conventional technology. This is not limited in this application.

Step 205: The imaging module performs electromagnetic wave imaging on the target object based on the location information and the electromagnetic scattering feature information.

Figure 12A:
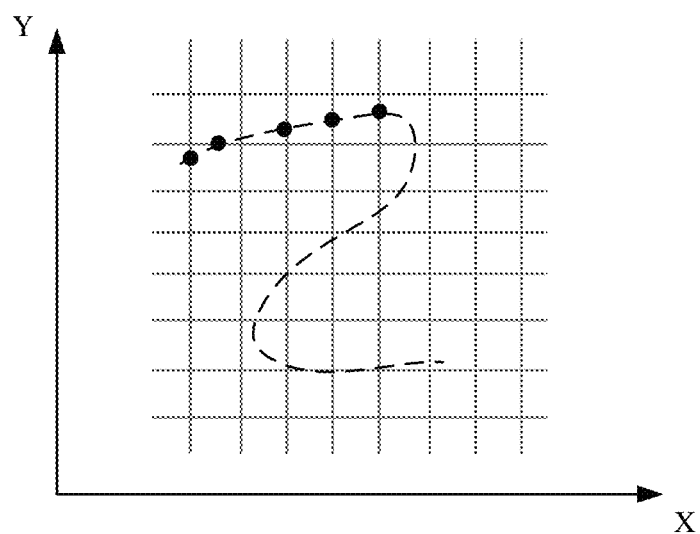
FIG. 12a is a schematic diagram of a moving track shown as an example.

For example, the imaging module may synchronously obtain, at a sampling moment set $\{t_i\}$, a set $\{\rho_i\}$ of electromagnetic scattering feature information input by the electromagnetic echo collection module and a set $\{P_i\}$ of location information of the antenna that is input by the self-positioning module. The imaging module may perform an operation of performing synthetic aperture electromagnetic imaging on the foregoing two groups of information. Specifically, the imaging module may determine a moving track of the antenna of the electromagnetic echo collection module at the moment set $\{t_i\}$ based on the location information input by the self-positioning module at the moment set. As shown in FIG. 12a, it should be noted that the moving track of the antenna may be a track on a two-dimensional plane, or may be a track in three-dimensional space. For convenience, FIG. 12a merely shows a moving track on the two-dimensional plane as an example. In the figure, X and Y represent two axes of the two-dimensional plane. For example, X represents a horizontal axis, and Y represents a vertical axis.

Figure 12B:
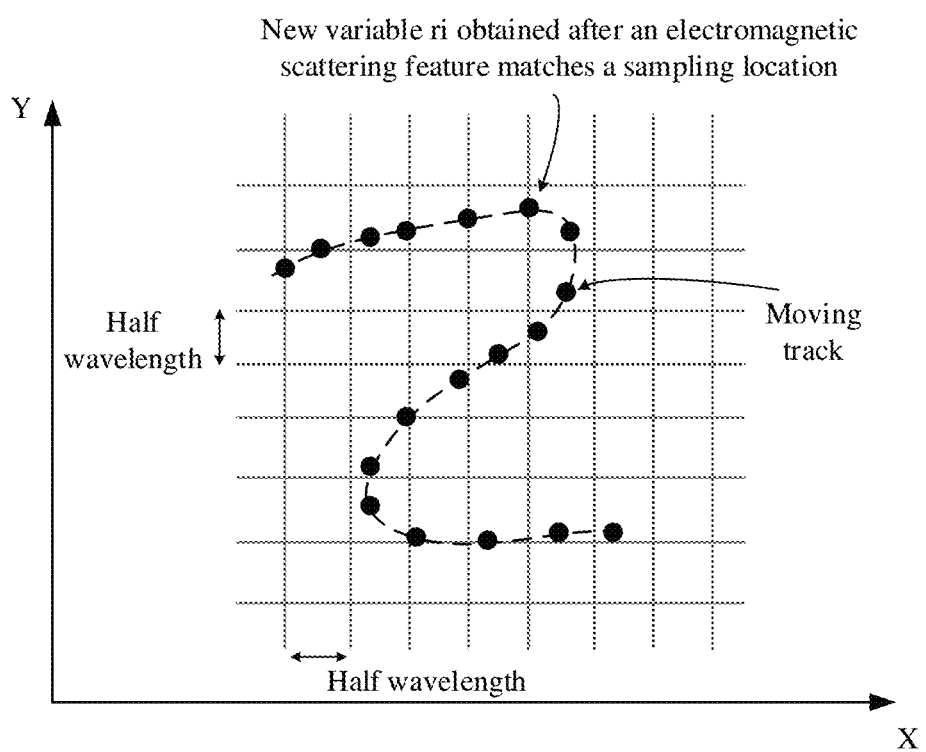
FIG. 12b is a schematic diagram of a moving track shown as an example.

Then the imaging module may determine a correspondence between any piece of electromagnetic scattering feature information $\rho_i$ in the set $\{\rho_i\}$ of electromagnetic scattering feature information and a point on the moving track, as shown in FIG. 12b. As described above, the correspondence between the electromagnetic scattering feature information and the point (namely, location information) on the moving track is a moment correspondence, which may also mean that the electromagnetic scattering feature information $\rho_i$ corresponds to the location information $P_i$ of the antenna at the moment $t_i$. It should be noted that in this embodiment, because sampling periods of the self-positioning module and the electromagnetic echo collection module are the same, the imaging module does not need to perform interpolation or extraction processing. To be specific, quantities of elements in the set $\{\rho_i\}$ of electromagnetic scattering feature information and the set $\{P_i\}$ of location information of the antenna are equal, and the elements are in a one-to-one moment correspondence. For ease of understanding, the correspondence may be represented as new sampling variables $\gamma_i \triangleq (\rho_i, P_i)$. A subscript i indicates a value of the moment $t_i$.

For example, if mesh processing is performed on the two-dimensional plane shown in FIG. 12b, for example, a half wavelength corresponding to an operating frequency $f_c$ of the device is a division unit, the new sampling variables are non-uniformly distributed. Correspondingly, the imaging module may perform electromagnetic wave imaging on the target object based on a non-uniform sampling synthetic aperture imaging method, and display an imaging result.

The foregoing embodiment is described by using a ranging sensor (namely, the femtosecond sensor) as an example. In this application, the sensor may be alternatively a goniometric sensor. For example, the self-positioning module may read angle information between each sensor and the positioning label, and obtain the relative location between the antenna and the positioning label based on a triangle positioning method.

For example, each of at least three goniometric sensors may obtain angle information between the goniometric sensor and the positioning label. For example, the angle information is an angle between the positioning label and a straight line between the goniometric sensor and another goniometric sensor. The self-positioning module may obtain, based on the angle information of each goniometric sensor and a relative location between the goniometric sensors, a distance between each goniometric sensor and the positioning label based on the triangle positioning method. For a specific calculation manner, refer to related descriptions of the triangle positioning method. Details are not described in this application. Similarly, the self-positioning module may calculate, by using the positioning label as an origin, the relative location between the antenna and the positioning label based on the distance between each goniometric sensor and the positioning label and a relative location between each goniometric sensor and the antenna.

Scenario 2

Figure 13:
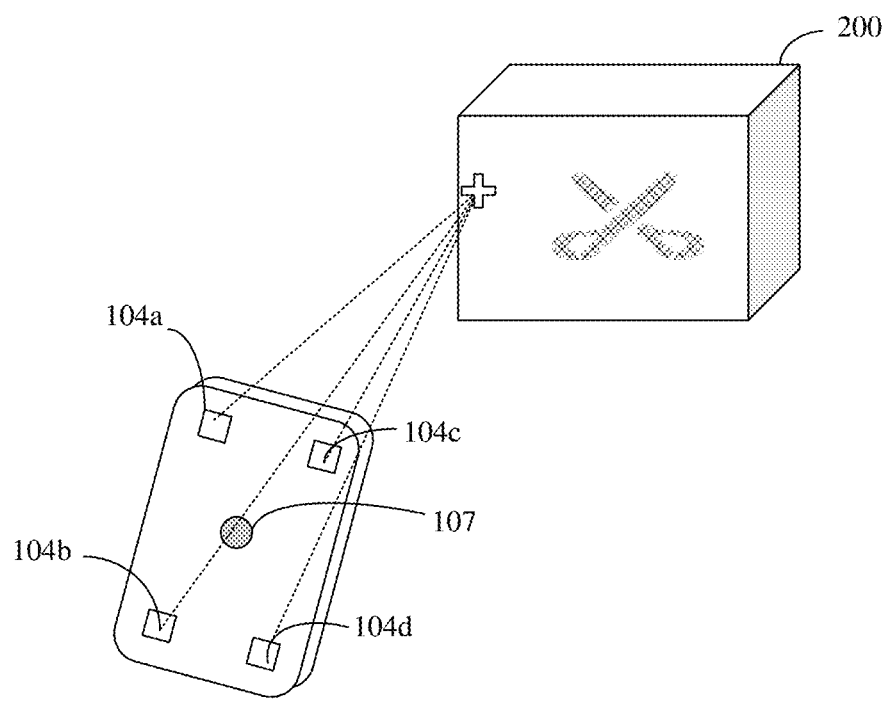
FIG. 13 is a schematic diagram of an application scenario according to an embodiment of this application.

FIG. 13 is a schematic diagram of an application scenario shown as an example. Referring to FIG. 13, for example, an electronic device 100 is a mobile phone, sensors 104, namely, 104a, 104b, 104c, and 104d, are disposed in the mobile phone, and a transceiver 107 is further disposed in the mobile phone. For example, the transceiver is an antenna. For example, in this embodiment, the sensor is a femtosecond sensor. It should be noted that a quantity and locations of sensors shown in this embodiment and the following embodiments and a relative location between the sensor and the antenna are examples. This is not limited in this application, and this is not repeated below.

Figure 14:
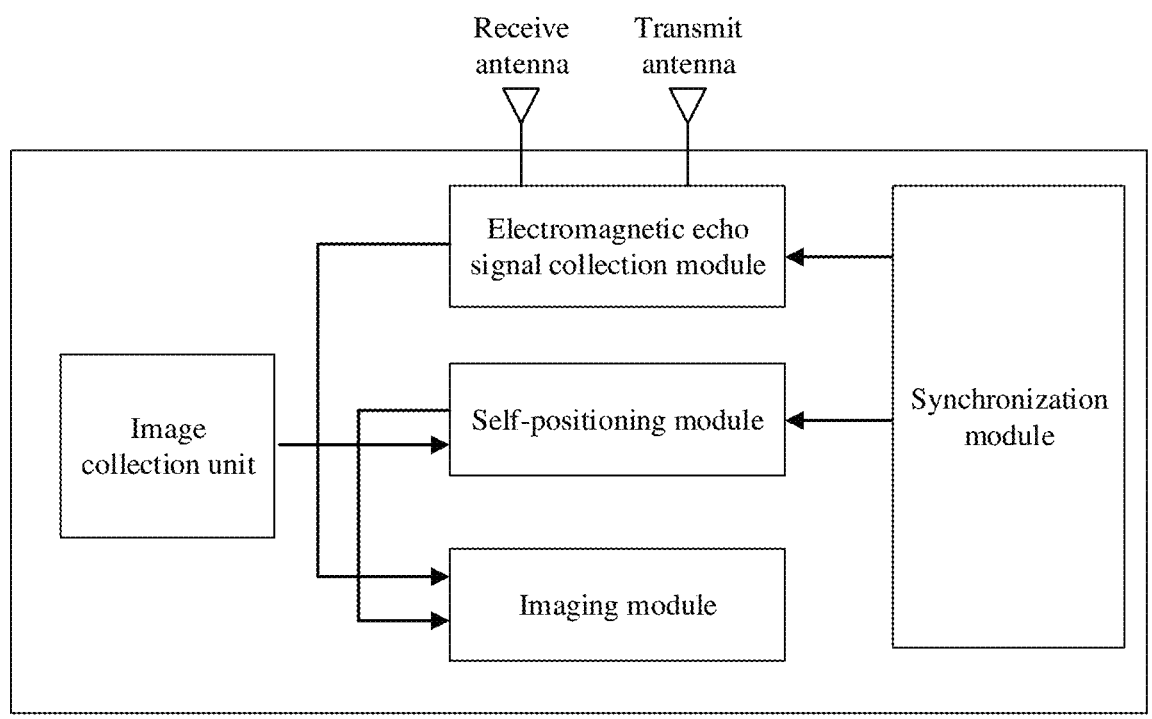
FIG. 14 is a block diagram of a software structure of an electronic device shown as an example.

In this embodiment, a positioning label is any feature point on a target object 200, and the feature point may be a feature point, for example, a pattern or a corner, that is on the target object 200 and that can be distinguished from another part. For example, the sensor 104 in this embodiment may be a sensor in an optical camera, and the sensor in the optical camera may collect an image of the target object 200. FIG. 14 is a diagram of a software structure of an electronic device shown as an example. Referring to FIG. 14, the electronic device further includes an image collection unit. The image collection unit (also referred to as an image processing unit) may be configured to perform image analysis on an image collected by the optical camera, to determine a feature point on the target object. For example, a scale-invariant feature transform (SIFT) algorithm or a histogram of oriented gradient (HOG) algorithm may be used. The image collection unit may obtain a distance between the feature point and the sensor. It should be noted that, in this embodiment, the sensor is a sensor in a depth camera, and in another embodiment, may be another sensor that can implement the technical solutions in embodiments of this application. It should be further noted that for processing details of the image collection unit, refer to the conventional technology. This is not limited in this application. For example, a time interval for collecting the image by the sensor may be the same as a period corresponding to a self-positioning module, so that system power consumption is reduced.

It should be noted that, unless otherwise specified, for a part not described in this application, refer to the descriptions of Scenario 1. Details are not described again in this application.

Figure 15:
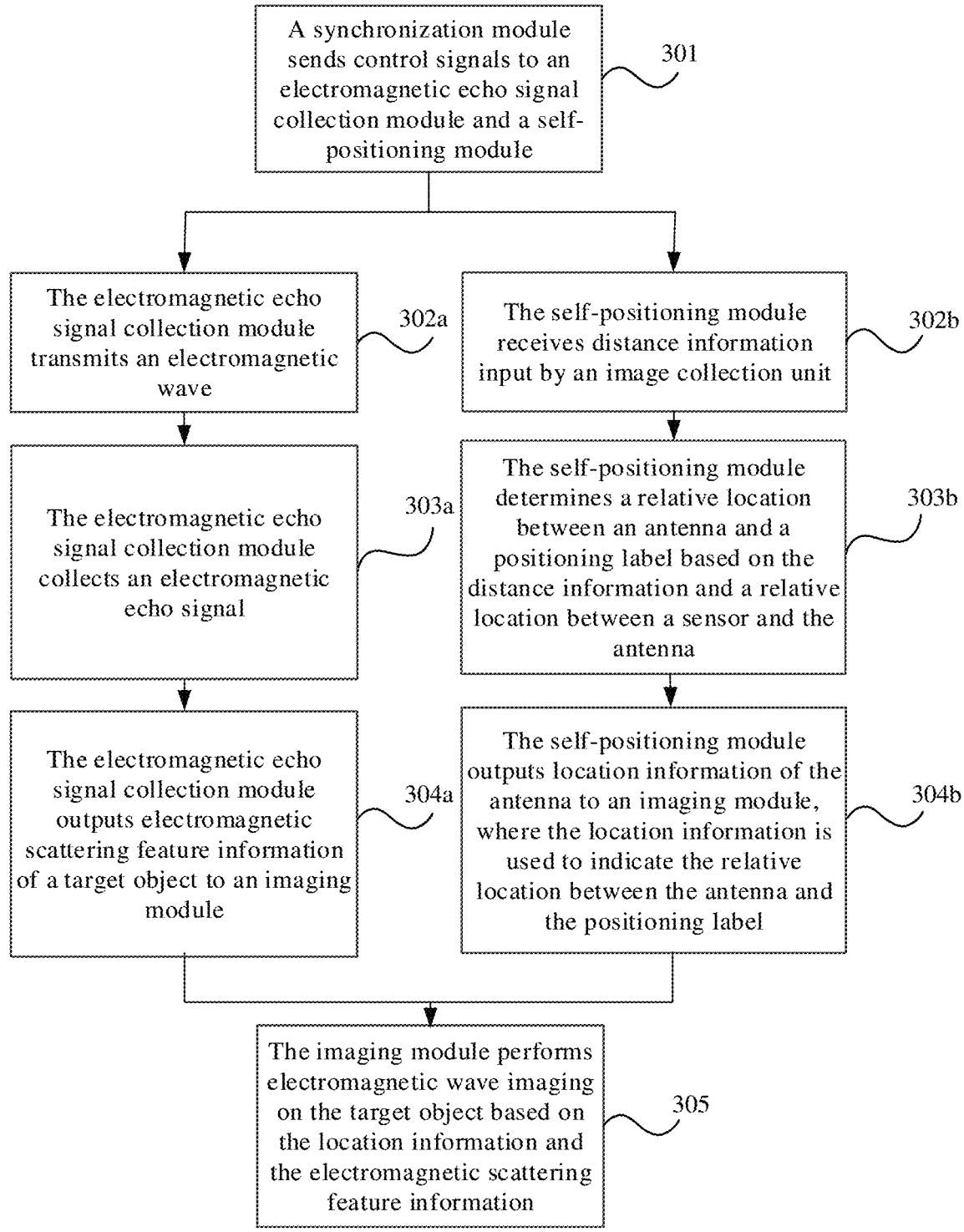
FIG. 15 is a schematic flowchart of an electromagnetic wave imaging method according to an embodiment of this application.

With reference to FIG. 14, FIG. 15 is a schematic flowchart of electromagnetic wave imaging according to an embodiment of this application. In FIG. 15.

Step 301: A synchronization module sends control signals to an electromagnetic echo signal collection module and a self-positioning module.

Step 302a: The electromagnetic echo signal collection module transmits an electromagnetic wave.

Step 303a: The electromagnetic echo signal collection module collects an electromagnetic echo signal.

Step 304a: The electromagnetic echo signal collection module outputs electromagnetic scattering feature information of a target object to an imaging module.

Step 302b: The self-positioning module receives distance information input by an image collection unit.

Step 303b: The self-positioning module determines a relative location between an antenna and a positioning label based on the distance information and a relative location between a sensor and the antenna.

Step 304b: The self-positioning module outputs location information of the antenna to the imaging module, where the location information is used to indicate the relative location between the antenna and the positioning label.

Step 305: The imaging module performs electromagnetic wave imaging on the target object based on the location information and the electromagnetic scattering feature information.

In a possible implementation, there may be two or more positioning labels. When there are a plurality of positioning labels, the self-positioning module may obtain relative locations (namely, coordinates) between a transceiver (namely, the antenna) and the plurality of positioning labels. The self-positioning system may perform multi-coordinate fusion on a plurality of pieces of obtained location information, for example, use a geometric centroid of a plurality of pairs of coordinates as coordinates of the transceiver, so that positioning precision can be improved, thereby further improving an electromagnetic wave imaging effect.

The foregoing mainly describes the solutions provided in embodiments of this application from the perspective of interaction between network elements. It may be understood that, to implement the foregoing functions, the electronic device includes a hardware structure and/or a software module for performing corresponding functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the electronic device may be divided into function modules based on the foregoing method example. For example, the function modules may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 16:
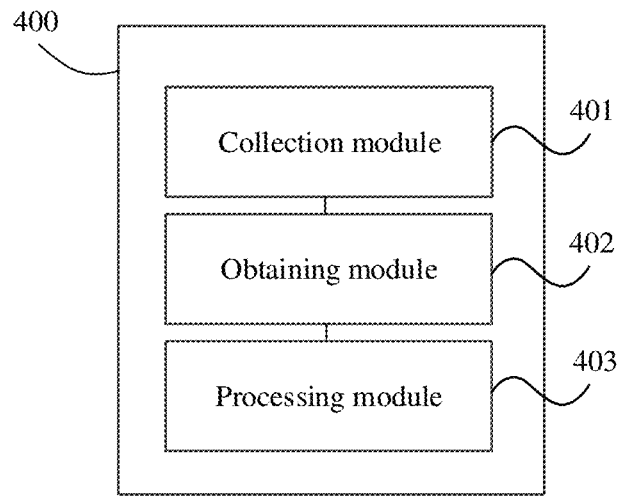
FIG. 16 is a schematic diagram of a structure of an electronic device according to an embodiment of this application.

When function modules are obtained through division based on corresponding functions, FIG. 16 is a possible schematic diagram of a structure of an electronic device 400 in the foregoing embodiment. As shown in FIG. 16, the electronic device 400 may include a collection module 401, an obtaining module 402, and a processing module 403. The collection module is configured to collect an electromagnetic echo signal. The electromagnetic echo signal is used to indicate electromagnetic wave scattering feature information of a target object. The obtaining module 402 is configured to obtain location information of a reception point of the electromagnetic echo signal. The location information is used to indicate relative location information between the reception point and a positioning label. The processing module 403 is configured to perform electromagnetic wave imaging on the target object based on the electromagnetic wave scattering feature information and the location information.

Based on the foregoing technical solutions, the collection module 401 is configured to collect electromagnetic echo signals at a plurality of moments. The obtaining module 402 is configured to obtain location information of reception points of electromagnetic echo signals at a plurality of moments. The processing module 403 is configured to perform electromagnetic wave imaging on the target object based on a plurality of pieces of electromagnetic wave scattering feature information and a correspondence between all of a plurality of pieces of location information and the plurality of pieces of electromagnetic wave scattering feature information.

Based on the foregoing technical solutions, the plurality of moments at which the electromagnetic echo signal is collected meet a first period, and the plurality of moments at which the location information is obtained meet a second period. The first period is the same as the second period; or there is a multiple relationship between the first period and the second period.

Based on the foregoing technical solutions, the electromagnetic wave imaging apparatus includes at least three sensors, and the obtaining module 402 is configured to: obtain relative location information between each of the at least three sensors and a positioning label, and obtain relative location information between the reception point and the positioning label based on relative location information between the at least three sensors and the positioning label and relative location information between the at least three sensors and the reception point.

Based on the foregoing technical solutions, the relative location information between the sensor and the positioning label is obtained based on distance information between the sensor and the positioning label.

Based on the foregoing technical solutions, the relative location information between the sensor and the positioning label is obtained based on angle information between the sensor and the positioning label.

Based on the foregoing technical solutions, the positioning label is at least one of the following: an identification point disposed on the target object, an identification point disposed in a specified range of the target object, and any feature point on the target object.

Based on the foregoing technical solutions, collection of the electromagnetic echo signal performed by the collection module 301 is synchronized with obtaining of the location information performed by the obtaining module 302.

Based on the foregoing technical solutions, the collection module 301 is configured to: transmit an electromagnetic wave, and receive an electromagnetic echo signal scattered by the target object.

Based on the foregoing technical solutions, the collection module 301 is configured to receive an electromagnetic echo signal released by the target object.

Figure 17:
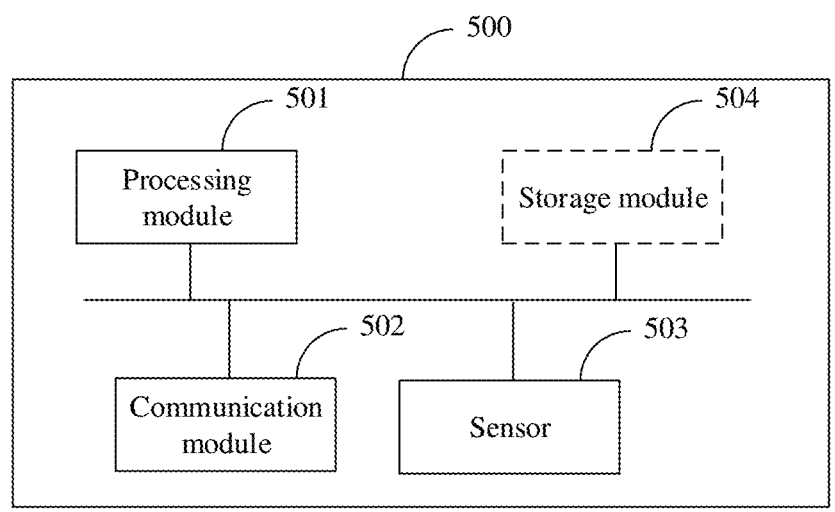
FIG. 17 is a schematic diagram of a structure of an apparatus according to an embodiment of this application.

The following describes an apparatus provided in embodiments of this application. As shown in FIG. 17, the apparatus includes a processing module 501, a communication module 502, and a sensor 503. Optionally, the apparatus further includes a storage module 504. The processing module 501, the communication module 502, the sensor 503, and the storage module 504 are connected by using a communication bus.

The communication module 502 may be an apparatus with a receiving/sending function, and is configured to send or receive a signal.

The storage module 504 may include one or more memories, and the memory may be components configured to store programs or data in one or more devices or circuits.

The storage module 504 may independently exist, and is connected to the processing module 501 by using the communication bus. The storage module may be alternatively integrated with the processing module 501.

The apparatus 500 may be used in an electronic device, a circuit, a hardware component, or a chip.

The apparatus 500 may be the electronic device in embodiments of this application. A schematic diagram of the electronic device may be shown in FIG. 3. Optionally, the communication module 502 of the apparatus 500 may include an antenna and a transceiver of the electronic device, for example, the antenna 105 and the transceiver 103 in FIG. 3.

The apparatus 500 may be a chip in the electronic device in embodiments of this application. The communication module 502 may be an input or output interface, a pin, a circuit, or the like. Optionally, the storage module may store computer executable instructions for a method on a network device side, so that the processing module 501 performs the method on the network device side in the foregoing embodiments. The storage module 504 may be a register, a cache, a RAM, or the like, and the storage module 504 may be integrated with the processing module 501. The storage module 504 may be a ROM or another type of static storage device that can store static information and instructions, and the storage module 504 may be independent of the processing module 501. Optionally, with development of wireless communication technologies, a transceiver may be integrated into the apparatus 500. For example, the transceiver 103 is integrated into the communication module 502.

When the apparatus 500 is the electronic device or a chip in the electronic device in embodiments of this application, the apparatus 500 may implement the method performed by the electronic device in the foregoing embodiments.

For a case in which the communication apparatus is implemented by a chip or a chip system, refer to a schematic diagram of a structure of a chip shown in FIG. 17. The chip shown in FIG. 17 includes a processor 501 and an interface 502. There may be one or more processors 501, and there may be a plurality of interfaces 502. Optionally, the chip or the chip system may include a memory 503.

Embodiments of this application further provide a computer-readable storage medium. All or some of the foregoing embodiments may be implemented by using software, hardware, firmware, or any combination thereof. If the method is implemented in software, a function may be stored on a computer-readable medium or transmitted on a computer-readable medium as one or more instructions or code. The computer-readable medium may include a computer storage medium and a communication medium, and may further include any medium that can transmit a computer program from one place to another. The storage medium may be any available medium accessible to a computer.

In an optional design, the computer-readable medium may include a RAM, a ROM, an EEPROM, a CD-ROM or another optical disk memory, a magnetic disk memory or another magnetic storage device, or any other medium that can be used to carry or store required program code in a form of an instruction or a data structure and that can be accessed by a computer. In addition, any connection is appropriately referred to as the computer-readable medium. For example, if software is transmitted from a website, a server, or another remote source by using a coaxial cable, an optical fiber/cable, a twisted pair, a digital subscriber line (DSL), or wireless technologies (for example, infrared ray, radio, and microwave), the coaxial cable, the optical fiber/cable, the twisted pair, the DSL, or the wireless technologies such as infrared ray, radio, and microwave are included in a definition of the medium. For example, a disk and an optical disc used in this specification include a compact disc (CD), a laser disc, an optical disc, a digital versatile disc (DVD), a floppy disk, and a Blu-ray disc. The disk usually magnetically reproduces data, and the optical disc optically reproduces data by using a laser. The foregoing combination should also be included in the scope of the computer-readable medium.

Embodiments of this application further provide a computer program product. All or some of the foregoing embodiments may be implemented by using software, hardware, firmware, or any combination thereof. If the method is implemented in software, the method may be completely or partially implemented in a form of a computer program product. The computer program product includes one or more computer instructions. When the foregoing computer program instructions are loaded and executed on a computer, all or some of the procedures or the functions described in the foregoing method embodiments are generated. The computer may be a general-purpose computer, a dedicated computer, a computer network, a network device, user equipment, or another programmable apparatus.

The foregoing describes embodiments of this application with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms fall within the protection scope of this application.

What is claimed is:

1. An electromagnetic wave imaging method, comprising:
   collecting, by an electromagnetic wave imaging apparatus, electromagnetic echo signals at a first plurality of moments to obtain a plurality of electromagnetic echo signals, wherein each electromagnetic echo signal indicates electromagnetic wave scattering feature information of a target object, and the plurality of electromagnetic echo signals indicate a plurality of pieces of electromagnetic wave scattering feature information;
   obtaining location information of reception points of the electromagnetic echo signals at a second plurality of moments, to obtain a plurality of pieces of location information, wherein each piece of location information indicates relative location information between the respective reception point and a positioning label; and
   performing electromagnetic wave imaging on the target object based on the plurality of pieces of electromagnetic wave scattering feature information and a correspondence between the plurality of pieces of location information and the plurality of pieces of electromagnetic wave scattering feature information; and
   wherein the first plurality of moments meet a first period, the second plurality of moments meet a second period, and there is a multiple relationship between the first period and the second period.

2. The method according to claim 1, wherein the electromagnetic wave imaging apparatus comprises at least three sensors, and obtaining the location information of the reception points of the electromagnetic echo signals at the second plurality of moments comprises:
   at each moment of the second plurality of moments, obtaining relative location information between each sensor of the at least three sensors and the positioning label, and obtaining a respective piece of relative location information between the corresponding reception point and the positioning label based on relative location information between the at least three sensors and the positioning label and relative location information between the at least three sensors and the corresponding reception point.

3. The method according to claim 2, wherein each piece of relative location information between the at least three sensors and the positioning label is obtained based on corresponding distance information between the at least three sensors and the positioning label.

4. The method according to claim 2, wherein each piece of relative location information between the at least three sensors and the positioning label is obtained based on corresponding angle information between the at least three sensors and the positioning label.

5. The method according to claim 1, wherein the positioning label is at least one of an identification point disposed on the target object, an identification point disposed in a specified range of the target object, or any feature point on the target object.

6. The method according to claim 1, wherein collection of the electromagnetic echo signals at the first plurality of moments is synchronized with obtaining location information of the reception points of the electromagnetic echo signals at the second plurality of moments.

7. The method according to claim 1, wherein collecting the electromagnetic echo signals at the first plurality of moments comprises:
at each of the first plurality of moments, transmitting an electromagnetic wave, and receiving a responsive electromagnetic echo signal scattered by the target object.

8. The method according to claim 1, wherein collecting the electromagnetic echo signals at the first plurality of moments comprises:
passively receiving electromagnetic echo signals released by the target object at the first plurality of moments.

9. The method according to claim 1, wherein the electromagnetic wave imaging apparatus is a mobile communication device.

10. The method according to claim 1, further comprising:
determining the correspondence between the plurality of pieces of location information and the plurality of pieces of electromagnetic wave scattering feature information by matching time stamps of the plurality of pieces of location information and the plurality of pieces of electromagnetic wave scattering feature information.

11. An electromagnetic wave imaging apparatus, comprising:
at least one processor;
a transceiver, configured to:
collect electromagnetic echo signals at a first plurality of moments, to obtain a plurality of electromagnetic echo signals, wherein each electromagnetic echo signal indicates electromagnetic wave scattering feature information of a target object, and the plurality of electromagnetic echo signals indicate a plurality of pieces of electromagnetic wave scattering feature information; and
a non-transitory computer-readable storage medium storing a program to be executed by the at least one processor, the program including instructions to:
obtain location information of reception points of the electromagnetic echo signals at a second plurality of moments, to obtain a plurality of pieces of location information, wherein each piece of location information indicates relative location information between a respective reception point and a positioning label; and
perform electromagnetic wave imaging on the target object based on the plurality of pieces of electromagnetic wave scattering feature information and a correspondence between the plurality of pieces of location information and the plurality of pieces of electromagnetic wave scattering feature information; and wherein the first plurality of moments meet a first period, the second plurality of moments meet a second period, and there is a multiple relationship between the first period and the second period.

12. The apparatus according to claim 11, wherein the electromagnetic wave imaging apparatus further comprises at least three sensors, and wherein the instructions to obtain the location information of the reception points of the electromagnetic echo signals at the second plurality of moments comprise instructions to:
at each moment of the second plurality of moments, obtain relative location information between each sensor of the at least three sensors and the positioning label, and obtain a respective piece of relative location information between the corresponding reception point and the positioning label based on relative location information between the at least three sensors and the positioning label and relative location information between the at least three sensors and the corresponding reception point.

13. The apparatus according to claim 12, wherein each piece of relative location information between the at least three sensors and the positioning label is obtained based on corresponding distance information between the at least three sensors and the positioning label.

14. The apparatus according to claim 12, wherein each piece of relative location information between the at least three sensors and the positioning label is obtained based on corresponding angle information between the at least three sensors and the positioning label.

15. The apparatus according to claim 11, wherein the positioning label is at least one of an identification point disposed on the target object, an identification point disposed in a specified range of the target object, or any feature point on the target object.

16. The apparatus according to claim 11, wherein collection of the electromagnetic echo signals at the first plurality of moments is synchronized with obtaining location information of the reception points of the electromagnetic echo signals at the second plurality of moments.

17. The apparatus according to claim 11, wherein the transceiver being configured to collect the electromagnetic echo signals at the first plurality of moments comprises the transceiver being configured to:
at each of the first plurality of moments, transmit an electromagnetic wave, and receive a responsive electromagnetic echo signal scattered by the target object.

18. The electromagnetic wave imaging apparatus according to claim 11, wherein the electromagnetic wave imaging apparatus is a mobile communication device.

19. A system comprising:
an electromagnetic echo signal collection module, configured to collect electromagnetic echo signals at a first plurality of moments to obtain a plurality of electromagnetic echo signals, and output first information to an imaging module, wherein each electromagnetic echo signal indicates electromagnetic wave scattering feature information of a target object, the plurality of electromagnetic echo signals indicate a plurality of pieces of electromagnetic wave scattering feature information, and the first information comprises the plurality of pieces of electromagnetic wave scattering feature information of the target object;

a self-positioning module, configured to obtain location information of reception points of the electromagnetic echo signals at a second plurality of moments, to obtain a plurality of pieces of location information, and output the plurality of pieces of location information to the imaging module, wherein each piece of location information indicates relative location information between the respective reception point and a positioning label; and the imaging module, configured to perform electromagnetic wave imaging on the target object based on the plurality of pieces of electromagnetic wave scattering feature information and a correspondence between the plurality of pieces of location information and the plurality of pieces of electromagnetic wave scattering feature information; and wherein the first plurality of moments meet a first period, the second plurality of moments meet a second period, and there is a multiple relationship between the first period and the second period.

20. The system according to claim 19, wherein the system is comprised in a mobile communication device.

\* \* \* \* \*